United States Patent
Tomita

[11] Patent Number: 5,948,035
[45] Date of Patent: Sep. 7, 1999

[54] METHOD AND APPARATUS FOR PREDICTING MINIMUM STOPPING DISTANCE REQUIRED TO BRAKE RUNNING VEHICLE

[75] Inventor: Yukiharu Tomita, Toyota, Japan

[73] Assignee: Toyota Jidosha Kabushiki Kaisha, Aichi-ken, Japan

[21] Appl. No.: 09/154,589

[22] Filed: Sep. 17, 1998

[30] Foreign Application Priority Data

Sep. 18, 1997 [JP] Japan ................................. 9-253945

[51] Int. Cl.⁶ ....................................................... B60T 8/00
[52] U.S. Cl. ................................ 701/70; 701/78; 701/79; 180/197; 303/122; 303/121; 303/1
[58] Field of Search ........................ 701/70–79; 180/197; 303/1, 121, 122

[56] References Cited

U.S. PATENT DOCUMENTS

Re. 33,557  3/1991  Kade et al. .............................. 303/100
4,828,334   5/1989  Salman .................................... 303/100

FOREIGN PATENT DOCUMENTS 52-38977  3/1977  Japan .

Primary Examiner—William A. Cuchlinski, Jr.
Assistant Examiner—Yonel Beaulieu
Attorney, Agent, or Firm—Pillsbury Madison & Sutro

[57] ABSTRACT

A method of predicting a minimum stopping distance required to stop a subject vehicle by a braking system thereof, including: (a) a step of obtaining measurement data for each of at least one sample vehicle which is braked by a braking system thereof operated with its full braking capacity, the measurement data including a weight and a running speed of the sample vehicle, a stopping distance through which the sample vehicle has run to be stopped, a tire radius of the sample vehicle, and optionally a tire width of the sample vehicle; (b) a step of obtaining at least one predicting equation on the basis of the measurement data in a statistical manner, the equation providing a predicted value of the minimum stopping distance on the basis of a weight, a running speed and a tire radius of the subject vehicle, and optionally a tire width of the subject vehicle; and (c) a step of calculating the predicted value of the minimum stopping distance, by substituting the weight, the running speed, the tire radius of the running vehicle, and optionally the tire width of the subject vehicle, into one of the at least one predicting equation, so that the equation provides the predicted value of the minimum stopping distance.

26 Claims, 18 Drawing Sheets

FIG. 4

| | MEASUREMENT DATA | | | | |
|---|---|---|---|---|---|
| | VEHICLE WEIGHT D1 | TIRE WIDTH D2 | DYNAMIC LOADED TIRE RADIUS D3 | BRAKE APPLICATION VEHICLE SPEED D4 | STOPPING DISTANCE D5 |
| C1 | 1264.000 | 155.000 | 0.279 | 100.300 | 54.200 |
| C2 | 1357.000 | 155.000 | 0.279 | 100.300 | 53.100 |
| C3 | 1325.000 | 175.000 | 0.273 | 100.500 | 43.500 |
| C4 | 1473.000 | 175.000 | 0.281 | 100.900 | 48.100 |
| C5 | 1481.000 | 165.000 | 0.286 | 100.200 | 50.500 |
| C6 | 1556.000 | 185.000 | 0.286 | 99.700 | 44.700 |
| C7 | 1452.000 | 175.000 | 0.281 | 103.000 | 52.700 |
| C8 | 1589.000 | 185.000 | 0.286 | 100.000 | 42.800 |
| C9 | 1492.000 | 195.000 | 0.283 | 100.600 | 42.900 |
| C10 | 1382.000 | 195.000 | 0.287 | 100.000 | 41.000 |
| C11 | 1568.000 | 175.000 | 0.293 | 100.200 | 51.900 |
| C12 | 1659.000 | 185.000 | 0.286 | 100.900 | 44.600 |
| C13 | 1475.000 | 165.000 | 0.286 | 100.800 | 54.000 |
| C14 | 1862.000 | 205.000 | 0.310 | 101.300 | 52.700 |
| C15 | 1862.000 | 205.000 | 0.310 | 101.000 | 50.400 |
| C16 | 1766.000 | 205.000 | 0.310 | 100.500 | 53.100 |

FIG. 5

| | ANALYTIC DATA | | | | |
|---|---|---|---|---|---|
| | X1=D1×D1/1000 | X2=1000/D2 | X3=D3×D3×1000 | X4=D4×D4 | X5=D5×D5 |
| C1 | 1597.696 | 6.452 | 77.841 | 10060.090 | 2937.640 |
| C2 | 1841.449 | 6.452 | 77.841 | 10060.090 | 2819.610 |
| C3 | 1755.625 | 5.714 | 74.529 | 10100.250 | 1892.250 |
| C4 | 2169.729 | 5.714 | 78.961 | 10180.810 | 2313.610 |
| C5 | 2193.361 | 6.061 | 81.796 | 10040.040 | 2550.250 |
| C6 | 2421.136 | 5.405 | 81.796 | 9940.090 | 1998.090 |
| C7 | 2108.304 | 5.714 | 78.961 | 10609.000 | 2777.290 |
| C8 | 2524.921 | 5.405 | 81.796 | 10000.000 | 1831.840 |
| C9 | 2226.064 | 5.128 | 80.089 | 10120.360 | 1840.410 |
| C10 | 1909.924 | 5.128 | 82.369 | 10000.000 | 1681.000 |
| C11 | 2458.624 | 5.714 | 85.849 | 10040.040 | 2693.610 |
| C12 | 2752.281 | 5.405 | 81.796 | 10180.810 | 1989.160 |
| C13 | 2175.625 | 6.061 | 81.796 | 10160.640 | 2916.000 |
| C14 | 3467.044 | 4.878 | 96.100 | 10261.690 | 2777.290 |
| C15 | 3467.044 | 4.878 | 96.100 | 10201.000 | 2540.160 |
| C16 | 3118.756 | 4.878 | 96.100 | 10100.250 | 2819.610 |

FIG. 6

| | PREDICTION $Y=SQRT(92.7767 \times X3 - 0.2907 \times X1 + 1.1826 \times X4 + 977.6808 \times X2 - 22057.04)$ | | |
|---|---|---|---|
| | PREDICTED VALUE Y | RESIDUAL D5-Y | |
| C1 | 53.898 | 0.302 | |
| C2 | 53.237 | −0.137 | |
| C3 | 43.341 | 0.159 | |
| C4 | 47.587 | 0.513 | |
| C5 | 51.892 | −1.392 | |
| C6 | 43.218 | 1.482 | |
| C7 | 52.809 | −0.109 | |
| C8 | 43.686 | −0.886 | |
| C9 | 41.332 | 1.568 | |
| C10 | 43.237 | −2.237 | → LARGEST RESIDUAL → CALCULATE CONFIDENCE LIMITS |
| C11 | 51.508 | 0.392 | |
| C12 | 45.346 | −0.746 | |
| C13 | 53.297 | 0.703 | |
| C14 | 52.494 | 0.206 | |
| C15 | 51.805 | −1.405 | |
| C16 | 51.632 | 1.468 | |

FIG. 7

| | MEASUREMENT DATA | | | | |
|---|---|---|---|---|---|
| | VEHICLE WEIGHT D1 | TIRE WIDTH D2 | DYNAMIC LOADED TIRE RADIUS D3 | BRAKE APPLICATION VEHICLE SPEED D4 | STOPPING DISTANCE D5 |
| C1 | 4735.000 | 195.000 | 0.326 | 49.400 | 12.340 |
| C2 | 4735.000 | 195.000 | 0.326 | 49.000 | 12.650 |
| C3 | 4975.000 | 165.000 | 0.361 | 49.600 | 14.160 |
| C4 | 4975.000 | 165.000 | 0.361 | 48.500 | 14.180 |
| C5 | 4180.000 | 177.800 | 0.359 | 49.800 | 13.370 |
| C6 | 4180.000 | 177.800 | 0.359 | 49.400 | 13.630 |
| C7 | 6385.000 | 177.800 | 0.372 | 50.100 | 15.690 |
| C8 | 6385.000 | 177.800 | 0.372 | 50.400 | 16.050 |
| C9 | 5525.000 | 177.800 | 0.372 | 50.900 | 15.640 |
| C10 | 5525.000 | 177.800 | 0.372 | 49.900 | 15.660 |
| C11 | 4685.000 | 195.000 | 0.326 | 50.800 | 12.890 |
| C12 | 4685.000 | 195.000 | 0.326 | 50.500 | 12.690 |
| C13 | 5780.000 | 177.800 | 0.372 | 49.100 | 14.740 |
| C14 | 5780.000 | 177.800 | 0.372 | 49.100 | 14.640 |
| C15 | 4740.000 | 177.800 | 0.359 | 50.000 | 13.800 |
| C16 | 4740.000 | 177.800 | 0.359 | 50.400 | 14.000 |

FIG. 8

| | ANALYTIC DATA | | | | |
|---|---|---|---|---|---|
| | X1=D1×D1/1000 | X2=1000/D2 | X3=D3×D3×1000 | X4=D4×D4 | X5=D5×D5 |
| C1 | 22420.225 | 5.128 | 106.276 | 2440.360 | 152.276 |
| C2 | 22420.225 | 5.128 | 106.276 | 2401.000 | 160.023 |
| C3 | 24750.625 | 6.061 | 130.321 | 2460.160 | 200.506 |
| C4 | 24750.625 | 6.061 | 130.321 | 2352.250 | 201.072 |
| C5 | 17472.400 | 5.624 | 128.881 | 2480.040 | 178.757 |
| C6 | 17472.400 | 5.624 | 128.881 | 2440.360 | 185.777 |
| C7 | 40768.225 | 5.624 | 138.384 | 2510.010 | 246.176 |
| C8 | 40768.225 | 5.624 | 138.384 | 2540.160 | 257.603 |
| C9 | 30525.625 | 5.624 | 138.384 | 2590.810 | 244.610 |
| C10 | 30525.625 | 5.624 | 138.384 | 2490.010 | 245.236 |
| C11 | 21949.225 | 5.128 | 106.276 | 2580.640 | 166.152 |
| C12 | 21949.225 | 5.128 | 106.276 | 2550.250 | 161.036 |
| C13 | 33408.400 | 5.624 | 138.384 | 2410.810 | 217.268 |
| C14 | 33408.400 | 5.624 | 138.384 | 2410.810 | 214.330 |
| C15 | 22467.600 | 5.624 | 128.881 | 2500.000 | 190.440 |
| C16 | 22467.600 | 5.624 | 128.881 | 2540.160 | 196.000 |

FIG. 9

| | PREDICTION $Y=\text{SQRT}(1.4142 \times X3 + 0.0021 \times X1 + 0.0977 \times X4 + 9.6825 \times X2 - 331.7838)$ | | |
|---|---|---|---|
| | PREDICTED VALUE Y | RESIDUAL D5−Y | |
| C1 | 12.396 | −0.056 | |
| C2 | 12.240 | 0.410 | |
| C3 | 14.266 | −0.106 | |
| C4 | 13.892 | 0.288 | |
| C5 | 13.562 | −0.192 | |
| C6 | 13.418 | 0.212 | |
| C7 | 15.787 | −0.097 | |
| C8 | 15.880 | 0.170 | |
| C9 | 15.349 | 0.291 | |
| C10 | 15.025 | 0.635 | → LARGEST RESIDUAL → CALCULATE CONFIDENCE LIMITS |
| C11 | 12.899 | −0.009 | |
| C12 | 12.784 | −0.094 | |
| C13 | 14.969 | −0.229 | |
| C14 | 14.969 | −0.329 | |
| C15 | 14.013 | −0.213 | |
| C16 | 14.152 | −0.152 | |

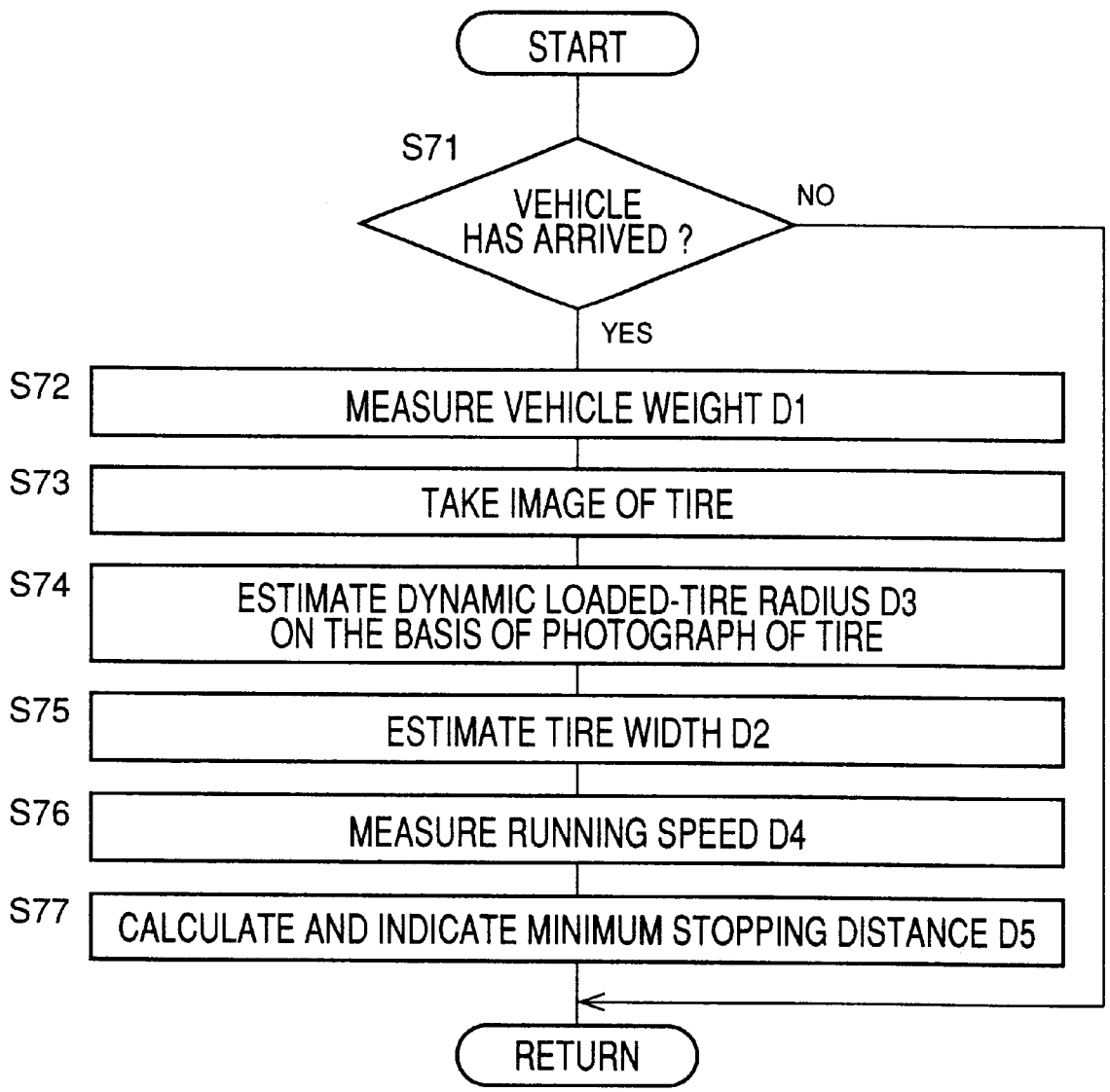

METHOD AND APPARATUS FOR PREDICTING MINIMUM STOPPING DISTANCE REQUIRED TO BRAKE RUNNING VEHICLE

The present application is based on Japanese Patent Application No. 9-253945 filed Sep. 18, 1997, the content of which is incorporated hereinto by reference.

BACKGROUND OF THE INVENTION

1. Field of the Invention

The present invention relates in general to techniques for predicting or estimating a minimum stopping distance of a running vehicle, which is required to stop the running vehicle by brake application.

2. Discussion of the Related Art

As disclosed in JP-A-52-38977, there is known a technique for calculating the minimum stopping distance X, which is required to stop a running vehicle by activation of a braking system thereof, by the following equation, and indicating the calculated minimum stopping distance X:

$$X = V^2/(2\mu g)$$

where,

V: brake application vehicle speed (running speed at the time when the braking system starts to be activated)

$\mu$: friction coefficient of a roadway surface on which the vehicle is running g: gravitational acceleration The present inventor found out a fact that the minimum stopping distance can be predicted more accurately by taking into account at least the weight of the vehicle, the radius of a tire of the vehicle and the brake application vehicle speed.

BRIEF SUMMARY OF THE INVENTION

It is therefore a first object of the present invention to provide a method of predicting the minimum stopping distance of a running vehicle with a higher accuracy.

A second object of the invention is to provide an apparatus suitable for practicing the above-indicated method.

The above first or second objects may be achieved according to any one of the following modes of the present invention, which are numbered and dependent from each other, to indicate possible combinations of elements or features in preferred forms of the present invention.

(1) A method of predicting a minimum stopping distance of a subject vehicle required to stop the subject vehicle by activation of a braking system thereof during running of the subject vehicle, characterized by including:

a step of obtaining measurement data for each of at least one sample vehicle which is braked by a braking system thereof operated with its full braking capacity, the at least one sample vehicle including at least one of a vehicle different in type from the subject vehicle and a vehicle identical in type with the subject vehicle but different in specification from the subject vehicle, the measurement data including a weight of the each sample vehicle, a running speed of the each sample vehicle when the braking system of the each sample vehicle starts to be activated, a stopping distance through which the each sample vehicle has run to be stopped, a radius of a tire of the each sample vehicle, and optionally an axial width of the tire of the each sample vehicle;

a step of obtaining at least one predicting equation on the basis of the measurement data in a statistical manner, the at least one predicting equation providing a predicted value of the minimum stopping distance on the basis of a weight of the subject vehicle, a running speed of the subject vehicle when the braking system of the subject vehicle starts to be activated, a radius of a tire of the subject vehicle, and optionally an axial width of the tire of the subject vehicle; and a step of calculating the predicted value of the minimum stopping distance of the subject vehicle, by substituting into one of the at least one predicting equation, the weight of the subject vehicle, the running speed of the subject vehicle, the radius of the tire of the subject vehicle, and optionally the axial width of the tire of the subject vehicle, so that the one predicting equation provides the predicted value of the minimum stopping distance.

In the present method, at least the vehicle weight, the tire radius and the brake application vehicle speed (running speed of the subject vehicle at the time when the braking system of the subject vehicle starts to be activated) are taken into account upon prediction of the minimum stopping distance, thereby permitting the minimum stopping distance of the subject vehicle to be predicted with a high accuracy.

The measurement data for the vehicle identical in type with the subject vehicle are not essential. That is, the predicting equation may be obtained only on the basis of the measurement data for the vehicle different in type from the subject vehicle. Accordingly, every time a predicting equation needs to be prepared for serving for a new subject vehicle whose minimum stopping distance is to be newly predicted, measurement data for the new subject vehicle need not be obtained. In addition, where the vehicle identical in type with the subject vehicle is employed as the sample vehicle, namely, where the measurement data for the identical vehicle are obtained, measurement data regarding each of the detailed specifications of the identical vehicle are not essential. Thus, it is possible to obtain predicting equations respectively serving for various kinds of vehicles, by effectively utilizing some of the existing measurement data which have been obtained before.

The term "stopping distance" may be interpreted to mean a braking distance through which the vehicle runs for an active braking time, or may be alternatively interpreted to mean a sum of the braking distance and a free running distance through which the vehicle runs for a free running time.

The term "tire radius" may be interpreted to mean a non-loaded-tire radius, or a static loaded-tire radius, or a dynamic loaded-tire radius. There will be described a relationship among the non-loaded-tire radius, the static loaded-tire radius and the static loaded-tire radius.

The term "with full braking capacity" may be interpreted to mean that the braking system of the vehicle exhibits the maximum full performance. More specifically described, where the vehicle refers to a vehicle equipped with an antilock braking system, it is interpreted to mean that the vehicle is braked so strongly that the antilock braking system is activated. Where the vehicle refers to a vehicle equipped with a non-antilock braking system (which does not include an antilock manner braking function), it is interpreted to mean that the vehicle is braked so strongly that a friction coefficient between the tire and a roadway surface on which the vehicle is running is maximized without the tire being locked.

According to the present method, measurement data for a vehicle identical both in type and specification with the subject vehicle are not essential for establishing the predicting equation serving for the subject vehicle. This is because the predicting equation need not be employed for predicting the minimum stopping distance where an actually measured value of the minimum stopping distance of the vehicle identical both in type and specification is available. However, if desired, the predicting equation may be obtained by using the measurement data for the vehicle identical both in type and specification.

The present method is applicable for predicting the minimum stopping distance where the vehicle is braked under a supposed, specific condition, without actually driving the vehicle. The present method is also applicable for predicting as needed the minimum stopping distance where the vehicle is braked under a desired condition during running of the vehicle, so as to inform the driver of the predicted minimum stopping distance, or so as to control a running state of the vehicle such that a distance between the subject vehicle and a certain object or a leading vehicle existing or running ahead of the subject vehicle is held larger than the predict minimum stopping distance.

(2) A method according to mode (1), wherein the above-described at least one predicting equation includes a linear multiple regression function for providing the predicted value of the minimum stopping distance on the basis of the weight of the subject vehicle, the running speed of the subject vehicle, the radius of the tire of the subject vehicle, and optionally the axial width of the tire of the subject vehicle.

In the present method in which the multiple regression function for providing the predicted value of the minimum stopping distance takes a linear form, the accuracy of the predicted value of the minimum stopping distance is easily improved over where the multiple regression function has a non-linear form, since the linear multiple regression function has a higher degree of reliability than that of the non-linear multiple regression.

(3) A method according to mode (1), wherein the above-described at least one predicting equation includes a linear multiple regression function for providing a criterion variable $X5$ which includes a component of $D5 \times D5$, on the basis of explanatory variables $X1$, $X2$, $X3$ and $X4$ which include a component of $D1 \times D1$, a component of $1/D2$, a component of $D3 \times D3$ and a component of $D4 \times D4$, respectively, where $D1$, $D2$, $D3$, $D4$ and $D5$ represent the weight of the subject vehicle, the axial width of the tire of the subject vehicle, the radius of the tire of the subject vehicle, the running speed of the subject vehicle, and the minimum stopping distance of the subject vehicle, respectively.

In the present method in which the single criterion variable $X5$ is calculated according to the linear multiple regression function having a comparatively higher reliability owing to its linear form, on the basis of the four explanatory variables $X1$, $X2$, $X3$ and $X4$, the prediction accuracy is easily improved. Further, the tire width, as well as the vehicle weight, the tire radius and the running speed (brake application vehicle speed), is taken into account upon prediction of the minimum stopping distance, whereby the prediction accuracy is further improved.

(4) A method according to mode (1), wherein the above-described at least one predicting equation includes a linear multiple regression function for providing a criterion variable $X5$ on the basis of explanatory variables $X1$, $X2$, $X3$ and $X4$, the $X1$, $X2$, $X3$, $X4$ and $X5$ being respectively represented by the following equations:

$$X1 = D1 \times D1/1000;$$

$$X2 = 1000/D2;$$

$$X3 = D3 \times D3 \times 1000;$$

$$X4 = D4 \times D4;$$

$$X5 = D5 \times D5;$$

where
$D1$ represents the weight of the subject vehicle;
$D2$ represents the axial width of the tire of the subject vehicle;
$D3$ represents the radius of the tire of the subject vehicle;
$D4$ represents the running speed of the subject vehicle; and
$D5$ represents the minimum stopping distance of the subject vehicle.

(5) A method according to any one of modes (1)–(4), wherein the above-described at least one predicting equation consists of a plurality of equations which serve for respective different levels of the running speed of the subject vehicle.

In the present method in which the above-described at least one predicting equation consists of a plurality of equations each of which serves for a corresponding one of the levels of the running speed of the subject vehicle, the prediction accuracy is easily improved over where a single predicting equation serves for all the levels of the running speed, i.g., a whole range within which the running speed is variable.

(6) A method according to any one of modes (1)–(5), wherein the above-described at least one equation includes an equation for providing the predicted value of the minimum stopping distance, on the basis of the weight of the subject vehicle, the running speed of the subject vehicle when the braking system starts to be activated, a characteristic value of a tread pattern provided on a surface of the tire, the radius of the tire of the subject vehicle, and optionally the axial width of the tire of the subject vehicle.

(7) A method according to any one of modes (1)–(6), wherein the radius of the tire of the each sample vehicle is a dynamic loaded-tire radius of the tire of the each sample vehicle, and the radius of the tire of the subject vehicle is a dynamic loaded-tire radius of the tire of the subject vehicle.

(8) A method of predicting a decelerating section distance through which a subject vehicle runs while being decelerated by a braking system thereof operated with its full braking capacity from a first nominal speed to a second nominal speed which is lower than the first nominal speed but higher than zero, characterized by including:

a step of obtaining measurement data for each of at least one sample vehicle which is driven at the first nominal speed and then braked by a braking system thereof operated with its full braking capacity, and which is driven at the second nominal speed and then braked by the braking system operated with its full braking capacity, the at least one sample vehicle including at least one of a vehicle different in type from the subject vehicle and a vehicle identical in type with the subject vehicle but different in specification from the subject vehicle, the measurement data including a weight of the each sample vehicle, a first running speed of the each sample vehicle when the braking system of the each sample vehicle starts to be activated during running of the each sample vehicle at the first nominal speed, a second running speed of the each sample vehicle when the braking system of the each sample vehicle starts to be activated during running of the each sample vehicle at the second nominal speed, a first stopping distance through which the each sample vehicle has run to be stopped where the each sample vehicle is driven at the first nominal speed, a second stopping distance through which the each sample vehicle has run to be stopped where the each sample vehicle is driven at the second nominal speed, a radius of a tire of the each sample vehicle, and optionally an axial width of the tire of the each sample vehicle;

a step of obtaining at least one first predicting equation and at least one second predicting equation on the basis of the measurement data in a statistical manner, the at least one first predicting equation providing a predicted value of a first minimum stopping distance required to stop the subject vehicle where the subject vehicle is driven at the first nominal speed, on the basis of a weight of the subject vehicle, a first running speed of the subject vehicle when the braking system of the subject vehicle starts to be activated during running of the subject vehicle at the first nominal speed, a radius of a tire of the subject vehicle, and optionally an axial width of the tire of the subject vehicle, the at least one second predicting equation providing a predicted value of a second minimum stopping distance required to stop the subject vehicle where the subject vehicle is driven at the second nominal speed, on the basis of the weight of the subject vehicle, a second running speed of the subject vehicle when the braking system of the subject vehicle starts to be activated during running of the subject vehicle at the second nominal speed, the radius of the tire of the subject vehicle, and optionally the axial width of the tire of the subject vehicle;

a step of calculating the predicted value of the second minimum stopping distance, by substituting, into one of the at least one second predicting equation, the weight of the subject vehicle, the second running speed, the radius of the tire of the subject vehicle, and optionally the axial width of the tire of the subject vehicle, so that the one second predicting equation provides the predicted value of the second minimum stopping distance;

a step of calculating the predicted value of the first minimum stopping distance, by substituting, into one of the at least one first predicting equation, the weight of the subject vehicle, the first running speed, the radius of the tire of the subject vehicle, and optionally the axial width of the tire of the subject vehicle, so that the one first predicting equation provides the predicted value of the first minimum stopping distance; and a step of obtaining the decelerating section distance by subtracting the predicted value of the second minimum stopping distance from the predicted value of the first minimum stopping distance.

The present method makes it possible to accurately predict the decelerating section distance through which the subject vehicle runs while being decelerated by the braking system operated with its full braking capacity from the first nominal speed to the second nominal speed which is lower than the first speed but higher than zero.

(9) A method according to mode (8), wherein the above-described second running speed is equal to a running speed of a leading vehicle which runs ahead of the subject vehicle which runs at the above-described first running speed, further including:

a step of detecting a distance between the subject vehicle and the leading vehicle; and a step of estimating the running speed of the leading vehicle on the basis of the first running speed and a rate of change of the distance between the subject vehicle and the leading vehicle.

(10) An apparatus for predicting a minimum stopping distance of a subject vehicle required to stop the subject vehicle by activation of a braking system thereof during running of the subject vehicle, characterized by including:

a data obtaining device for obtaining a weight of the subject vehicle, a running speed of the subject vehicle, a radius of a tire of the subject vehicle, and optionally an axial width of the tire of the subject vehicle;

a memory device for storing therein at least one predicting equation for providing a predicted value of the minimum stopping distance on the basis of the weight, the running speed when the braking system of the subject vehicle starts to be activated, the radius, and optionally the axial width; and a stopping-distance predicting device for providing the predicted value of the minimum stopping distance, by substituting the weight, the running speed, the radius, and optionally the axial width, into one of the at least one predicting equation.

The present apparatus makes it possible to accurately predict the minimum stopping distance, as is clear from the above description relating to mode (1). It is understood that the above description relating to mode (1) is applicable to the feature of the present mode.

(11) An apparatus according to mode (10), wherein the data obtaining device includes a force sensor for detecting a force acting between sprung members of the subject vehicle and an axle of the subject vehicle, a camera for taking an image of the tire, and a rotational speed sensor for detecting at least one of a rotational speed of an output shaft of a transmission of the subject vehicle and a rotational speed of a wheel of the subject vehicle.

(12) An apparatus according to mode (11), wherein the stopping-distance predicting device includes a signal processing device which obtains the weight, the radius and optionally the axial width, and the running speed, on the basis of an output signal provided by the force sensor, an output signal provided by the camera, and an output signal provided by the rotational speed sensor, respectively.

(13) An apparatus according to mode (10), wherein the apparatus is installed on the subject vehicle, further including an indicator for indicating the predicted value of the minimum stopping distance.

(14) An apparatus according to mode (10), wherein the apparatus is installed at a specific position of a roadway through which the subject vehicle passes, further including an indicator for indicating the predicted value of the minimum stopping distance.

(15) An apparatus installed on a subject vehicle, for predicting a minimum stopping distance of the subject vehicle required to stop the subject vehicle by activation of a braking system thereof during running of the subject vehicle, so as to control a running state of the subject vehicle, characterized by including:

an apparatus defined in mode (10);

an actuator for changing the running state of the subject vehicle;

a control device for controlling the actuator on the basis of the minimum stopping distance which has been predicted by the apparatus defined in mode (10), such that a distance between the subject vehicle and an object which exists ahead of the subject vehicle is held equal to or larger than the minimum stopping distance.

With the present apparatus installed on the vehicle, the running state of the vehicle is controlled on the basis of the accurately predicted minimum stopping distance, whereby the safety of the running vehicle is improved.

(16) An apparatus installed on a subject vehicle, for preventing a collision of the subject vehicle with a leading vehicle running ahead of the subject vehicle, by controlling a running state of the subject vehicle, characterized by including:

an apparatus defined in mode (10);

an actuator for changing the running state of the subject vehicle;

a detecting device for detecting a distance between the subject vehicle and the leading vehicle;

an estimating device for estimating a running speed of the leading vehicle on the basis of the running speed of the subject vehicle and a rate of change of the distance between the subject vehicle and the leading vehicle;

a decelerating-section-distance predicting device for predicting a decelerating section distance through which the subject vehicle runs while being decelerated by the braking system operated with its full braking capacity from the running speed of the subject vehicle to the running speed of the leading vehicle, on the basis of the predicted value of the minimum stopping distance of the subject vehicle and a predicted value of the minimum stopping distance of the leading vehicle which value is obtained by substituting the weight, the running speed of the leading vehicle, the radius, and optionally the axial width into one of the at least one predicting equation; and a control device for controlling the actuator on the basis of the decelerating section distance, such that the distance between the subject vehicle and the leading vehicle is held equal to or larger than the decelerating section distance.

(17) An apparatus according to mode (16), wherein a decelerating-section-distance predicting device predicts the decelerating section distance by subtracting the predicted value of the minimum stopping distance of the leading vehicle, from the predicted value of the minimum stopping distance of the subject vehicle.

(18) An apparatus according to any one of modes (10)–(17), wherein the at least one predicting equation includes a linear multiple regression function for providing the predicted value of the minimum stopping distance on the basis of the weight of the subject vehicle, the running speed of the subject vehicle at the time when the subject vehicle starts to be braked, the radius of the tire of the subject vehicle, and optionally the axial width of the tire of the subject vehicle.

(19) An apparatus according to any one of modes (10)–(18), wherein the at least one predicting equation includes a linear multiple regression function for providing a criterion variable X5 on the basis of explanatory variables X1, X2, X3 and X4, the X1, X2, X3, X4 and X5 being respectively represented by the following equations:

$X1 = D1 \times D1/1000;$ $X2 = 1000/D2;$ $X3 = D3 \times D3 \times 1000;$ $X4 = D4 \times D4;$ $X5 = D5 \times D5;$ where D1 represents the weight of the subject vehicle, D2 represents the axial width of the tire of the subject vehicle, D3 represents the radius of the tire of the subject vehicle, D4 represents the running speed of the subject vehicle, and D5 represents the minimum stopping distance of the subject vehicle.

BRIEF DESCRIPTION OF THE SEVERAL VIEWS OF THE DRAWING

The above and optional objects, features, advantages and technical and industrial significance of this invention will be better understood by reading the following detailed description of presently preferred embodiments of the invention, when considered in connection with the accompanying drawings, in which:

FIG. 4 is a table showing various kinds of measurement data used for obtaining a predicting equation for predicting the minimum stopping distance of the vehicle equipped with an antilock braking system in the first embodiment;

FIG. 5 is a table showing various kinds of analytic data used for obtaining the predicting equation for predicting the minimum stopping distance of the vehicle equipped with the antilock braking system in the first embodiment;

FIG. 6 is a table showing predicted values (Y) and residuals (D5-Y) in the respective samples (C1–C16), to explain the reliability of the predicting equation for predicting the minimum stopping distance of the vehicle equipped with the antilock braking system in the first embodiment;

FIG. 7 is a table showing various kinds of measurement data used for obtaining a predicting equation for predicting the minimum stopping distance of the vehicle equipped with a non-antilock braking system in the first embodiment;

FIG. 8 is a table showing various kinds of analytic data used for obtaining the predicting equation for predicting the minimum stopping distance of the vehicle equipped with the non-antilock braking system in the first embodiment;

FIG. 9 is a table showing predicted values (Y) and residuals (D5-Y) in the respective samples (C1–C16), to explain the reliability of the predicting equation for predicting the minimum stopping distance of the vehicle equipped with the non-antilock braking system in the first embodiment;

FIG. 21 is a flow chart illustrating a routine executed according to a program stored in ROM of FIG. 20, for predicting the minimum stopping distance of the running vehicle.

DETAILED DESCRIPTION OF THE INVENTION

Figure 1:
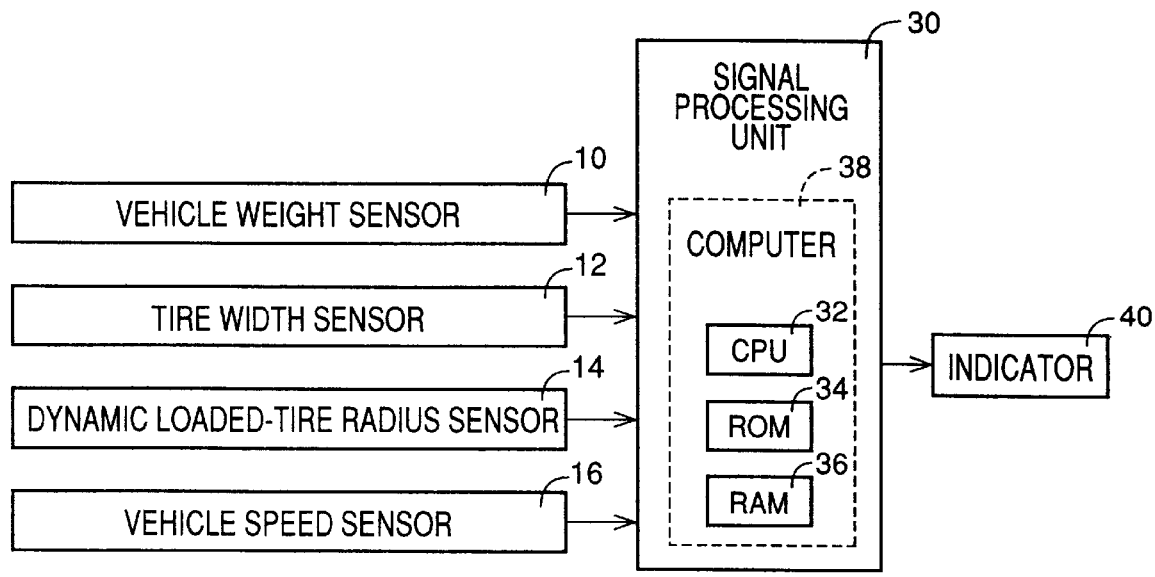
FIG. 1 is a block diagram illustrating a first embodiment of the present invention, in the form of an apparatus for predicting a minimum stopping distance of a running vehicle, which is required to stop the running vehicle by brake application.

Referring first to FIG. 1, there will be described a first embodiment of the present invention in the form of an apparatus (hereinafter simply referred to as "predicting apparatus") for carrying out a method of predicting a minimum stopping distance required to bring a running vehicle to a stop by activation of a braking system provided on the vehicle. The predicting apparatus whose functional elements are schematically illustrated in the block diagram of FIG. 1 is installed on the vehicle. As shown in FIG. 1, the predicting apparatus includes a vehicle weight sensor 10 for detecting the weight of the vehicle, a tire width sensor 12 for detecting the axial width (axial dimension) of a tire of the vehicle, a dynamic loaded-tire radius sensor 14 for detecting the radius of the vehicle tire under a dynamic load applied thereto (dynamic loaded-tire radius) during running of the vehicle, and a vehicle speed sensor 16 for detecting the running speed of the vehicle.

The vehicle weight sensor 10 may take the form of a sensor which is interposed between sprung members of the vehicle and an axle of the vehicle to detect a force acting between the sprung members and the axle of the vehicle. The tire width sensor 12 may be constituted principally by a camera which is attached to one of the sprung members of the vehicle to take an image of the tire as viewed in the radial direction of the tire. The dynamic loaded-tire radius sensor 14 may be constituted principally by a camera which is attached to one of the sprung members of the vehicle to take an image of the tire as viewed in the axial direction of the tire. The vehicle speed sensor 16 may be adapted to detect the rotational speed of an output shaft of a transmission which serves to transmit an output of an engine to a vehicle wheel, and generates an output signal indicative of the running speed of the vehicle obtained on the basis of the detected rotational speed of the output shaft, or may be alternatively adapted to detect rotational speeds of a plurality of vehicle wheels so as to estimate the running speed on the basis of the highest one of the detected rotational speeds of the respective wheels, in view of a fact that the highest wheel speed most closely represents the actual running speed of the vehicle.

Figure 2:
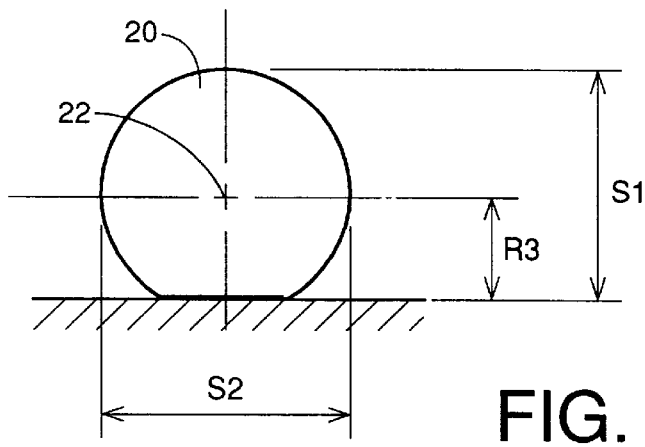
FIG. 2 is a side view of a vehicle tire, showing various dimensions of the tire.

The Japan Automobile Tire Manufacturers' Association, Inc. (JATMA) defines the dynamic loaded-tire radius R1 as a value obtained by dividing a running distance per one revolution of the tire which is attached to the vehicle through a suitable rim, by $2\pi$, where the vehicle runs on a flat, straight roadway at a speed of 60 [km/h]. In addition to the dynamic loaded-tire radius R1, there are other terms expressing the tire radius, such as a non-loaded tire radius R2 and a static loaded-tire radius R3. The non-loaded tire radius R2 is defined as a radius of the tire without an application of a load thereto from the road surface. The static loaded-tire radius R3 is defined, as shown in FIG. 2, as a radial distance from the road surface to a center 22 of a tire 20 of the vehicle where the tire 20 is deformed at its contact portion due to the load applied to the tire 20 from the road surface. There is established a relationship among the dynamic loaded-tire radius R1, the non-loaded tire radius R2 and the static loaded-tire radius R3, which is expressed as follows:

$$R2 > R1 > R3$$

The predicting apparatus further includes a signal processing unit 30 having an input port to which the above-described sensors are connected, as shown in FIG. 1. The signal processing unit 30 is constituted principally by a computer 38 incorporating a CPU 32, a ROM 34 and a RAM 36. The ROM 34 stores a program for executing a stopping-distance predicting routine illustrated in a flow chart of FIG. 3. The stopping-distance predicting routine is executed by the CPU 32 in cooperation with the RAM 36, for thereby predicting the minimum stopping distance required to stop the running vehicle by braking application. The signal processing unit 30 has an output port to which an indicator 40 is connected. The indicator 40 is provided at a position within the vehicle, which position permits the indicator 40 to be easily seen by the driver of the vehicle, so as to inform the driver of the predicted minimum stopping distance.

Figure 3:
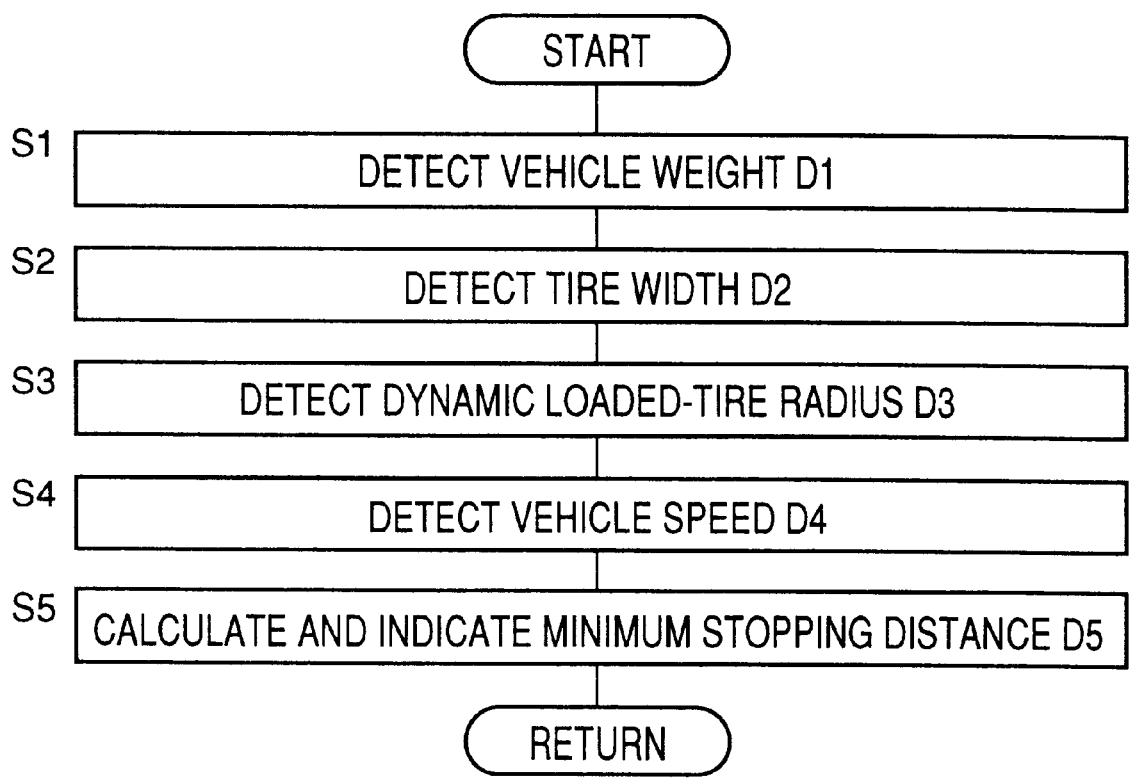
FIG. 3 is a flow chart illustrating a routine executed according to program stored in ROM of FIG. 1, for predicting the minimum stopping distance.

The stopping-distance predicting routine of FIG. 3 is repeatedly executed after the ignition key switch is turned ON until the same is turned OFF. Each cycle of execution of the stopping-distance predicting routine is initiated with step S1 to detect the vehicle weight D1 by the vehicle weight sensor 10. Then, the control flow goes to step S2 to detect the tire width D2 by the tire width sensor 12. Step S2 is followed by step S3 in which the dynamic loaded-tire radius D3 is detected by the dynamic loaded-tire radius sensor 14. The control flow then goes to step S4 in which the vehicle running speed D4 is detected by the vehicle speed sensor 16. Step S4 is followed by step S5 in which the minimum stopping distance D5 of the running vehicle is calculated on the basis of the detected values D1–D4, and the calculated minimum stopping distance D5 is then indicated by the indicator 40. After the implementation of step S5, one cycle of execution of the routine is completed. It is noted that the minimum stopping distance D5 is defined in a narrow sense of the braking distance, i.e., a distance through which the vehicle runs for an active braking time (for a time period from a moment of initiation of an actual braking effect to a moment at which the vehicle is brought to a stop).

There will be described principles which are applied to the calculation of the minimum stopping distance D5 on the basis of the detected values D1–D4.

1. Definitions of Variables
Explanatory variable D1: Vehicle weight [kg]
Explanatory variable D2: Tire width [mm]
Explanatory variable D3: Dynamic loaded-tire radius [m]
Explanatory variable D4: Brake application vehicle speed (Running speed at the time when braking system starts to be activated)[km/h]
Criterion variable D5: Minimum stopping distance [m]

2. Transformation of Variables (1) Purpose of Transformation

For increasing the degree of confidence of a multiple regression function which represents the relationship between the explanatory variables (D1–D4) and the criterion variable (D5) and which is used to predict the criterion variable on the basis of the explanatory variables, namely, for minimizing a deviation of the predicted value from the actual value, it is desirable that the multiple regression function takes a linear form so that the function is graphed or described by a straight line. The degree of confidence of the multiple regression function (hereinafter referred to as "predicting equation") can be measured by a contribution rate adjusted by degrees of freedom $R^{*2}$. The variables are suitably transformed for the purpose of improving the degree of confidence so that the contribution rate adjusted by degrees of freedom $R^{*2}$ is equal to or larger than 90%.

(2) Transformations $$X1=D1 \times D1/1000$$

$$X2=1000/D2$$

$$X3=D3 \times D3 \times 1000$$

$$X4=D4 \times D4$$

$$X5=D5 \times D5$$

3. Obtaining Predicting Equations (Multiple Regression Functions) for Predicting Minimum Stopping Distance D5

Predicting equations for predicting the minimum stopping distance D5 include at least one predicting equation for predicting the minimum stopping distance D5 where a vehicle equipped with an antilock braking system (hereinafter referred to as "ABS") is braked with the ABS fully activated at the vehicle running speed (brake application vehicle speed) of 100 [km/h], and at least one predicting equation for predicting the minimum stopping distance D5 where a vehicle equipped with a non-antilock braking system is braked with the braking system fully activated at the vehicle running speed (brake application vehicle speed) of 50 [km/h].

(1) Measurements of D1, D4 and D5 and Determination of D2 and D3 Prior to Obtaining Predicting Equations Regarding a plurality of sample vehicles equipped with the respective ABSs and including a vehicle different in type from the subject vehicle (whose minimum stopping distance is to be predicted) and a vehicle identical in type to the subject vehicle, the vehicle weight D1, the tire width D2, the dynamic loaded-tire radius D3, the brake application vehicle speed D4 (vehicle speed upon initiation of actual braking effect) and the minimum stopping distance D5 are measured or determined. The weight D1, brake application vehicle speed D4 and minimum stopping distance D5 are measured where each of the sample vehicles is braked by the braking system operated with the full braking capacity, while the tire width D2 and dynamic loaded-tire radius D3 are determined in accordance with the respective standard values (defined by the JATMA standard). And also, regarding a plurality of sample vehicles equipped with the respective non-antilock braking system and including a vehicle different in type from the subject vehicle and a vehicle identical in type to the subject vehicle, the same data D1, D2, D3, D4 and D5 are measured or determined in the same manner as described above.

(2) Measurement Data

The measurement data regarding the vehicles equipped with the respective ABSs are shown in FIG. 4, while those regarding the vehicles equipped with the respective non-antilock braking system are shown in FIG. 7.

(3) Analytic Data Based on Measurement Data

Analytic data into which the respective measurement data for the vehicles equipped with the respective ABSs are suitably transformed as described above are shown in FIG. 5, while those regarding the vehicles equipped with the respective non-antilock braking system are shown in FIG. 8.

(4) Obtained Predicting Equations (a) Equations for Predicting y (=X5)

Where the predicted value of X5 is represented by "y", the predicted value of X5 for the vehicle equipped with the ABS is given as:

$$y=92.7767 \times X3-0.2907 \times X1+1.1826 \times X4 +977.6808 \times X2-22057.04$$

The predicted value of X5 for the vehicle equipped with the non-antilock braking system is given as:

$$y=1.4142 \times X3+0.0021 \times X1+0.0977 \times X4 +9.6825 \times X2-331.7838$$

(b) Equations for predicting Y (=D5)

The minimum stopping distance D5 corresponds to the square root of X5 (D5×D5=X5). Where the predicted value of D5 is represented by "Y", therefore, the predicted value of D5 for the vehicle equipped with the ABS is given as:

$$Y=SQRT(92.7767 \times X3-0.2907 \times X1+1.1826 \times X4 +977.6808 \times X2-22057.04)$$

Similarly, the predicted value of D5 for the vehicle equipped with the non-antilock braking system is given as:

$$Y=SQRT(1.4142 \times X3+0.0021 \times X1+0.0977 \times X4 +9.6825 \times X2-331.7838)$$

It is noted that Y in either of the cases takes a positive number of the square root.

(5) Confidence Limits of Obtained Predicting Equations (a) Equation for predicting X5 of the vehicle equipped with the ABS FIG. 6 shows the predicted values Y and residuals (D5-Y) each of which corresponds to a deviation of the predicted value Y from the measured value D5. The residuals range from −2.237 to 1.468 [m], and the width of the range is accordingly 3.71 [m]. According to the calculation using the data of the sample C10 which has the largest residual (−2.237), a 99% confidence interval for the measured value (a range with a probability of 99% that the measured value lies within the range) ranges from 43.239−5.82 [m] to 43.239+5.12 [m], and the width of the range is accordingly 10.94 [m].

(b) Equation for predicting X5 of the vehicle equipped with the non-antilock braking system FIG. 9 shows the predicted values Y and residuals (D5-Y) each of which corresponds to a deviation of the predicted value Y from the measured value D5. The residuals range from −0.329 to 0.635 [m], and the width of the range is accordingly 0.964 [m]. According to the calculation using the data of the sample C10 which has the largest residual (0.635), a 99% confidence interval for the measured value ranges from 15.063−1.05 [m] to 15.063+0.98 [ml], and the width of the range is accordingly 2.03 [m].

(6) Relationship between Predicting Equation and Brake Application Vehicle Speed The predicting equation varies depending upon the level of the brake application vehicle speed (running speed at the time when the braking system starts to be activated). Therefore, a plurality of predicting equations are prepared such that each of the equations serves for the corresponding level of the brake application vehicle speed.

(7) Relationship between Predicting Equation and Type of Braking System

The braking system employed for the motor vehicle is generally of a friction brake type, such as a drum type brake and a disc type brake. The predicting equation of the present invention permits accurate prediction of the minimum stopping distance irrespective of the particular type of the friction system.

4. Physical Significance of Variables (1) Physical Significance of Transformations Suppose that the entire kinetic energy of the vehicle is transformed into a frictional work of the tire 20 upon braking of the vehicle, the following equation (1) is established:

$$(\tfrac{1}{2})mV^2 = FS \qquad (1)$$

where, m: weight of the vehicle

V: running speed of the vehicle

F: force acting on the vehicle

S: distance through which the vehicle is moved while the force F is acting on the vehicle By dividing both sides of the equation (1) by F, the following equation (2) is derived:

$$(\tfrac{1}{2})\, mV^2/F = S \qquad (2)$$

By squaring both sides of the equation (2), the following equation (3) is derived:

$$(\tfrac{1}{4})m^2V^4/F^2 = S^2 \qquad (3)$$

The equation (3) indicates that $m^2V^4/F^2$ and $S^2$ are proportional to each other. Taking account of this proportional relationship, the transformations of the variables D1, D4 and D5 are as follows:

$$X1 = D1 \times D1$$

$$X4 = D4 \times D4 \times D4 \times D4$$

$$X5 = D5 \times D5$$

With respect to X4, however, the multiple regression function with D4×D4 shows a higher contribution rate adjusted by the degrees of freedom $R^{*2}$, than that with D4×D4×D4×D4. Therefore, the variable D4 is transformed into D4×D4. With respect to F, the "$1/F^2$" in the above equation (3) tends to vary with the time and is accordingly difficult to be specified. Instead, the characteristic of F is considered to be represented by the explanatory variables X2 and X3.

(2) Relationship Between Braking Capacity and Dynamic Loaded Tire Radius

Where the braking system of the vehicle is a drum brake, the braking capacity of the vehicle can be expressed by an index such as the diameter of the brake drum, which corresponds to twice as large as a distance between the center of the tire and the friction surface of the drum which contacts with the brake shoes upon activation of the drum brake, as follows:

(Brake Drum Diameter)=(Distance between Tire Center and Drum Surface contacting with Brake Shoes)×2

Where the braking system of the vehicle is a disc brake, the braking capacity of the vehicle can be expressed by an effective diameter of the disc, which corresponds to twice as large as a distance between the center of the tire and the axis of the brake cylinder piston for forcing the brake pad onto the disc surface, as follows:

(Disc Effective Diameter)=(Distance between Tire Center and Axis of Brake Cylinder Piston)×2

Further, the required braking capacity increases with an increase in the dynamic loaded-tire radius, since the dynamic loaded-tire radius generally increases with an increase in the total vehicle weight. Thus, the dynamic loaded-tire radius can be considered as another index of the braking capacity.

In view of this, the present inventor proposed the following equation which defines an index K indicative of the braking capacity:

*K*=(Drum Diameter or Effective Disc Diameter)/(Dynamic Loaded-Tire Radius)/1000

In the measurement data for the vehicles equipped with the ABS as shown in the table of FIG. 4, the value of the index K ranges from 0.645 to 0.799. In the measurement data for the vehicles equipped with the non-antilock braking system as shown in the table of FIG. 7, the value of the indicator K ranges from 0.724 to 0.886.

The predicting equations obtained as described above are stored in the ROM 34. The predicting equations stored in the ROM 34 are grouped into those which serve for the vehicle equipped with the ABS and those which serve for the vehicle equipped with the non-antilock braking system. Further, the predicting equations in each of the groups serve for the respective different levels of the brake application vehicle speed (running speed at the time when the braking system starts to be activated), so that a different predicting equation is selected with each increase or decrease of 5–10 [km/h] in the brake application vehicle speed, for example. In step S5 of FIG. 3, the running speed D4 is detected as the brake application vehicle speed by the vehicle speed sensor 16, and one of the predicting equations which corresponds to the detected value of the running speed D4 is read out from the ROM 34, so that the detected values D1–D4 are substituted into the selected predicting equation, to predict the minimum stopping distance D5.

It will be understood from the above description of the present embodiment that the vehicle weight sensor 10, the tire width sensor 12, the dynamic loaded-tire radius sensor 14 and the vehicle speed sensor 16 cooperate with each other to constitute a data obtaining device. A portion of the ROM 34 assigned to store therein the predicting equations constitutes a memory device. The signal processing unit 30 constitutes a predicting device.

Figure 10:
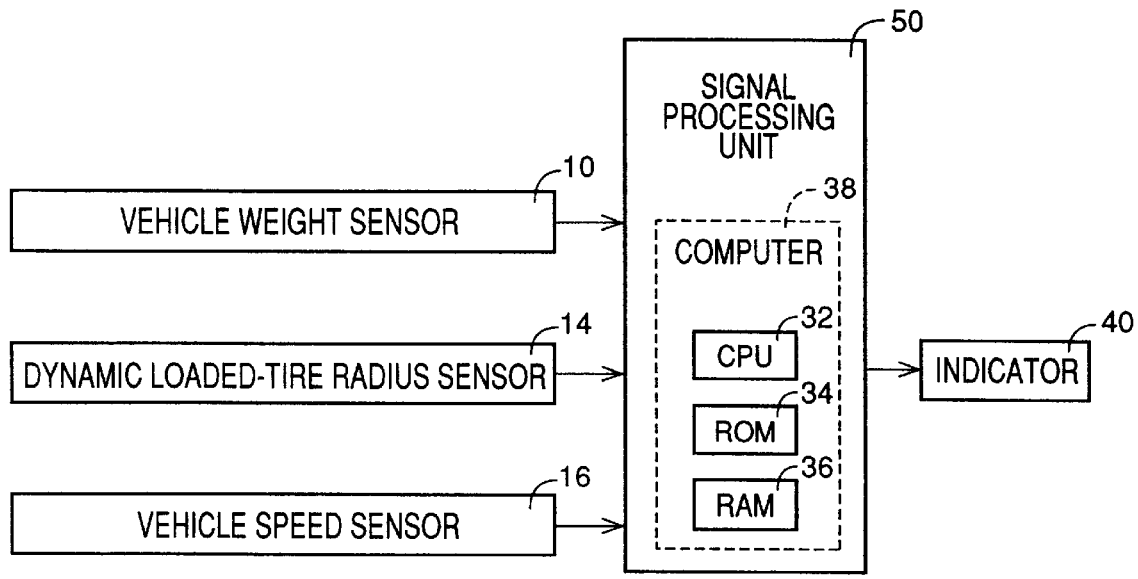
FIG. 10 is a block diagram illustrating a second embodiment of the present invention, in the form of an apparatus for predicting the minimum stopping distance of the running vehicle.
Figure 11:
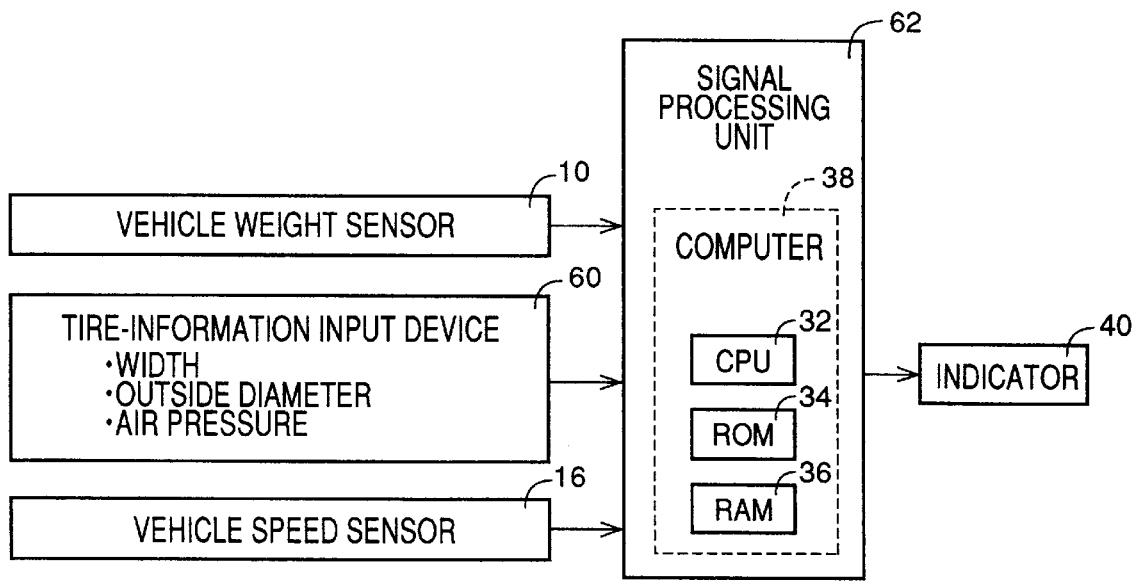
FIG. 11 is a block diagram illustrating a third embodiment of the present invention, in the form of an apparatus for predicting the minimum stopping distance of the running vehicle.

Referring next to FIGS. 10 and 11, there will be described second and third embodiments of the present invention. In FIGS. 10 and 11, the same reference numerals and characters as used in the first embodiment will be used to identify the corresponding elements, and redundant description of these elements will not be provided in the interest of simplification of the explanation.

The block diagram of FIG. 10 schematically illustrates the second embodiment of the present invention, in the form of an apparatus for predicting the minimum stopping distance of the vehicle. In the present predicting apparatus in which the tire width is fixed at a predetermined value on an assumption that all the vehicles are identical in the tire width with each other, the tire width sensor is not provided while the predetermined value of the tire width is stored as the fixed value in the ROM 34.

The block diagram of FIG. 11 schematically illustrates the third embodiment of the present invention, in the form of an apparatus for predicting the minimum stopping distance. In the present predicting apparatus, the tire width sensor and the dynamic loaded-tire radius sensor are replaced with a tire information input device 60 which is operated by the driver of the vehicle for inputting data respectively indicative of the width, outside diameter and air pressure of the tire into a signal processing unit 62. The signal processing unit 62 serves to estimate the dynamic loaded-tire radius according to a predetermined rule, on the basis of the vehicle weight which has been detected through the vehicle weight sensor 10 and the above-described data (indicative of the width, outside diameter and air pressure of the tire) which are inputted by the tire information device 60.

Figure 12:
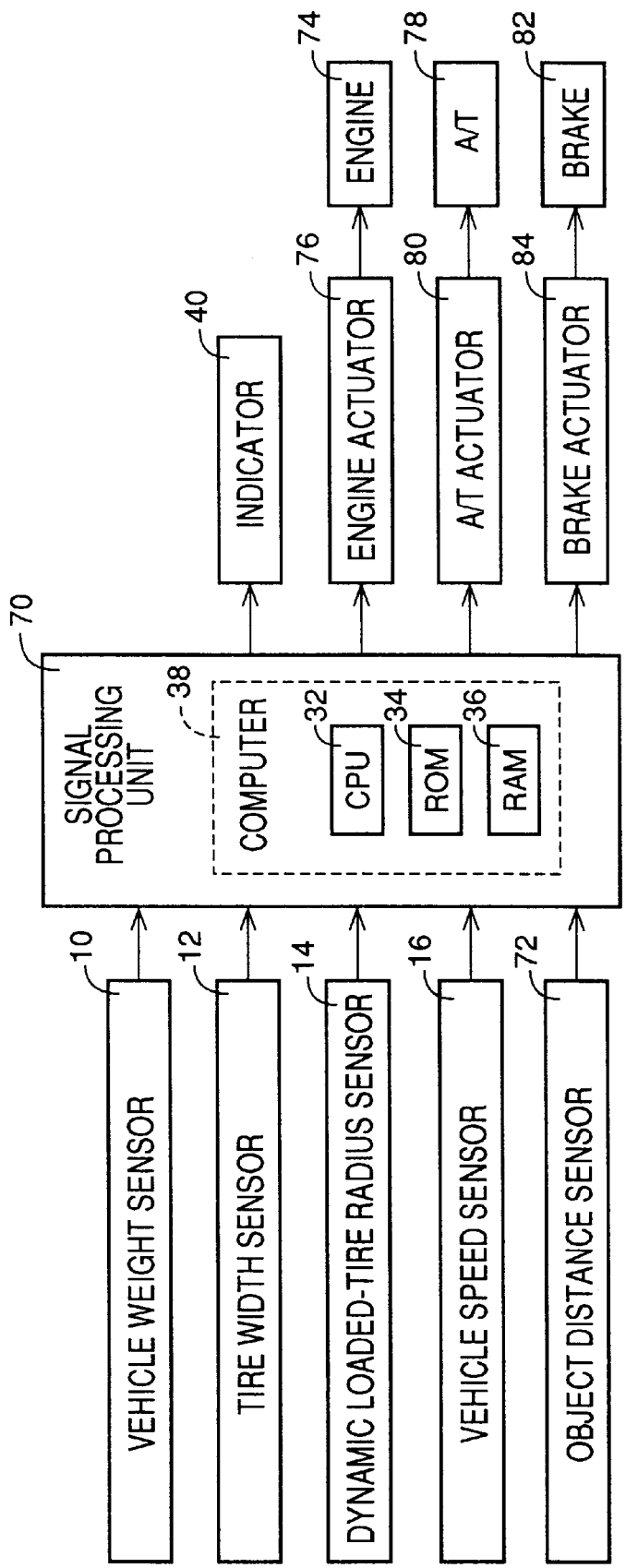
FIG. 12 is a block diagram illustrating a fourth embodiment of the present invention, in the form of an apparatus for preventing a front-end collision of the vehicle with a certain object.
Figure 13:
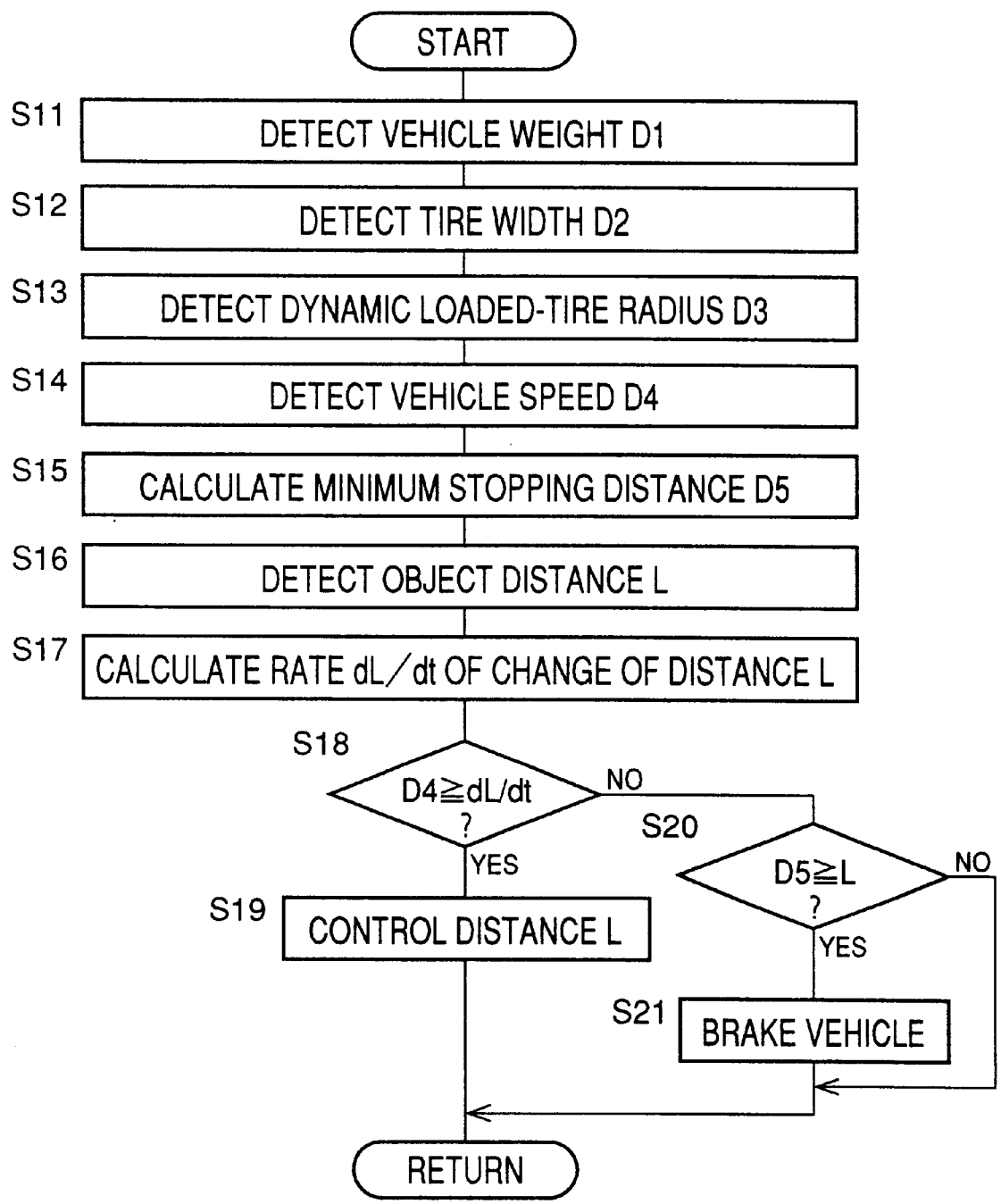
FIG. 13 is a flow chart illustrating a routine executed according to a program stored in ROM of FIG. 12, for preventing the front-end collision of the vehicle.

Referring next to FIGS. 12 and 13, there will be described a fourth embodiment of the present invention. In FIGS. 12 and 13, the same reference numerals and characters as used in the first embodiment will be used to identify the corresponding elements, and redundant description of these elements will not be provided in the interest of simplification of the explanation.

The block diagram of FIG. 12 schematically illustrates the fourth embodiment of the present invention, in the form of an apparatus for preventing a front-end collision of the vehicle with a certain object. The present apparatus includes a signal processing unit 70 having an input port to which an object distance sensor 72 as well as the above-described sensors 10, 12, 14, 16 are connected. The object distance sensor 72 is adapted to detect an object distance L between the running vehicle and an object located ahead of the running vehicle. The signal processing unit 70 further has an output port to which an engine actuator 76, an A/T actuator 80 and a brake actuator 84 as well as the indicator 40 are connected. The engine actuator 76 serves to change the output of an engine 74. The A/T actuator 80 serves to change the transmission ratio of an automatic transmission (hereinafter simply referred to as "A/T") 78 which transmits the output of the engine 74 to the drive wheel of the vehicle. The brake actuator 84 serves to change the braking force generated by a brake 82.

The engine 74 may take the form of an internal combustion engine or an electric motor. The engine actuator 76 may take the form of a motor which is adapted to change the opening angle of the throttle valve provided within the intake pipe of the internal combustion engine, or may alternatively take the form of a control circuit which is adapted to control an electric current supplied to the electric motor. The A/T actuator 80 may be an electromagnetic solenoid for controlling the transmission ratio of the A/T 78. The brake 82 may be a friction brake which is mechanically or electrically operated. The brake actuator 84 may be constituted principally by a fluid-pressure controlling valve device which is electro-magnetically operated to control the fluid pressure, or may alternatively be constituted principally by a control circuit which is adapted to control an electric current supplied to a motor to activate the brake 82.

FIG. 13 is a flow chart illustrating a routine executed according to a program stored in the ROM 34, for preventing a front-end collision of the vehicle with the certain object. This collision preventing routine is initiated with step S11 to detect the vehicle weight D1 by the vehicle weight sensor 10. Then, the control flow goes to step S12 to detect the tire width D2 by the tire width sensor 12. Step S12 is followed by step S13 in which the dynamic loaded-tire radius D3 is detected by the dynamic loaded-tire radius sensor 14. The control flow then goes to step S14 in which the vehicle running speed D4 is detected by the vehicle speed sensor 16. Step S14 is followed by step S15 in which the detected values D1–D4 are respectively substituted into the selected one of the above-described predicting equations so that the minimum stopping distance D5 is calculated.

Then, the control flow goes to step S16 which is implemented to detect the above-described object distance L by the object distance sensor 72. Step S16 is followed by step S17 in which a rate dL/dt of change of the detected object distance L is calculated. The control flow then goes to step S18 which is implemented to judge whether the vehicle running speed D4 is equal to or larger than the changing rate dL/dt. If the vehicle running speed D4 is equal to or larger than the rate dL/dt, an affirmative decision is obtained in step S18. In this case, the object detected by the object distance sensor 72 is considered to be a leading or preceding vehicle which runs ahead of the subject vehicle (whose front-end collision is prevented), and the control flow goes to step S19 in which the engine 74, the A/T 78 and the brake 82 are controlled by the engine actuator 76, the A/T actuator 80 and the brake actuator 84, respectively, to optimize the object distance L. The distance between the subject vehicle and the leading vehicle is thus controlled.

If the vehicle running speed D4 is lower than the change rate dL/dt, on the other hand, a negative decision is obtained in step S18. In this case, the object detected by the object distance sensor 72 is then considered to be a stationary object, and the control flow goes to step S20 which is implemented to judge whether the object distance L is equal to or smaller than the predicted minimum stopping distance D5. If the object distance L is equal to or smaller than the minimum stopping distance D5, an affirmative decision is obtained in step S20. The affirmative decision in step S20 is followed by step S21 in which the vehicle is automatically braked by the braking system operated with the full braking capacity by the engine actuator 76, the A/T actuator 80 and the brake actuator 84 (principally by the brake actuator 84), for automatically preventing the front-end collision of the vehicle with the forward object. If the object distance L is larger than the minimum stopping distance D5, a negative decision is obtained in step S20. In this case, the control flows goes back to step S11 without implementing step S21.

Figure 14:
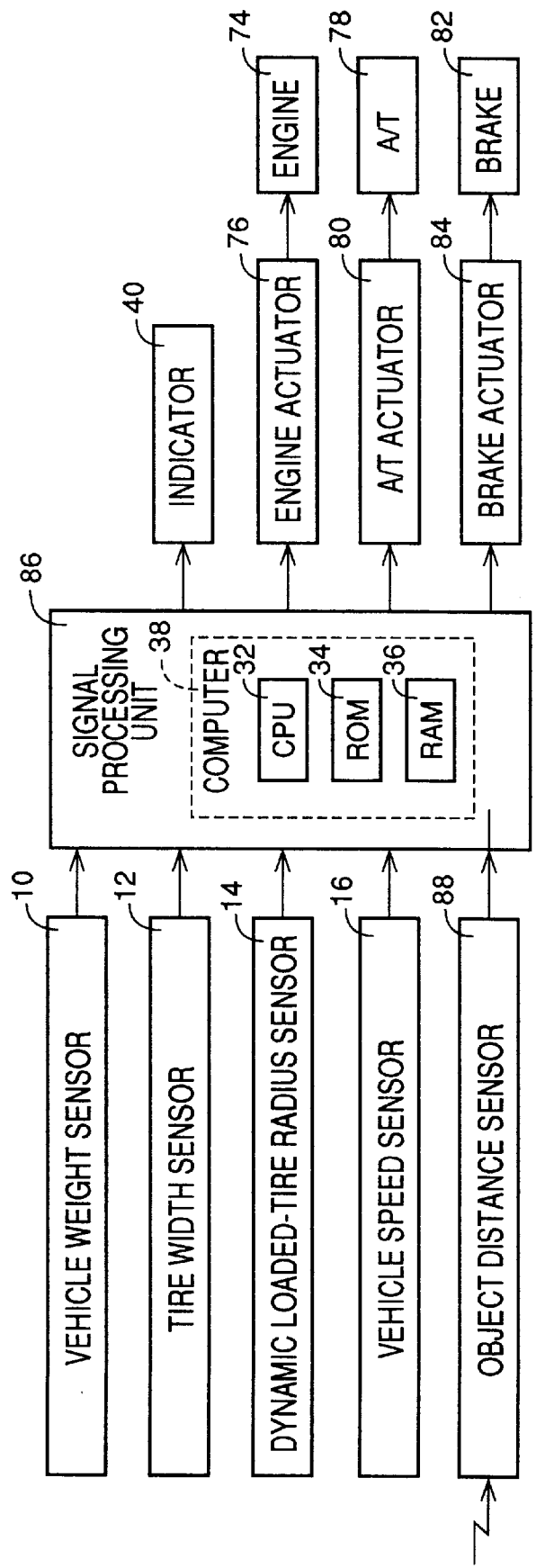
FIG. 14 is a block diagram illustrating a fifth embodiment of the present invention, in the form of an apparatus for decelerating the vehicle when the vehicle is approaching a corner of the roadway.
Figure 15:
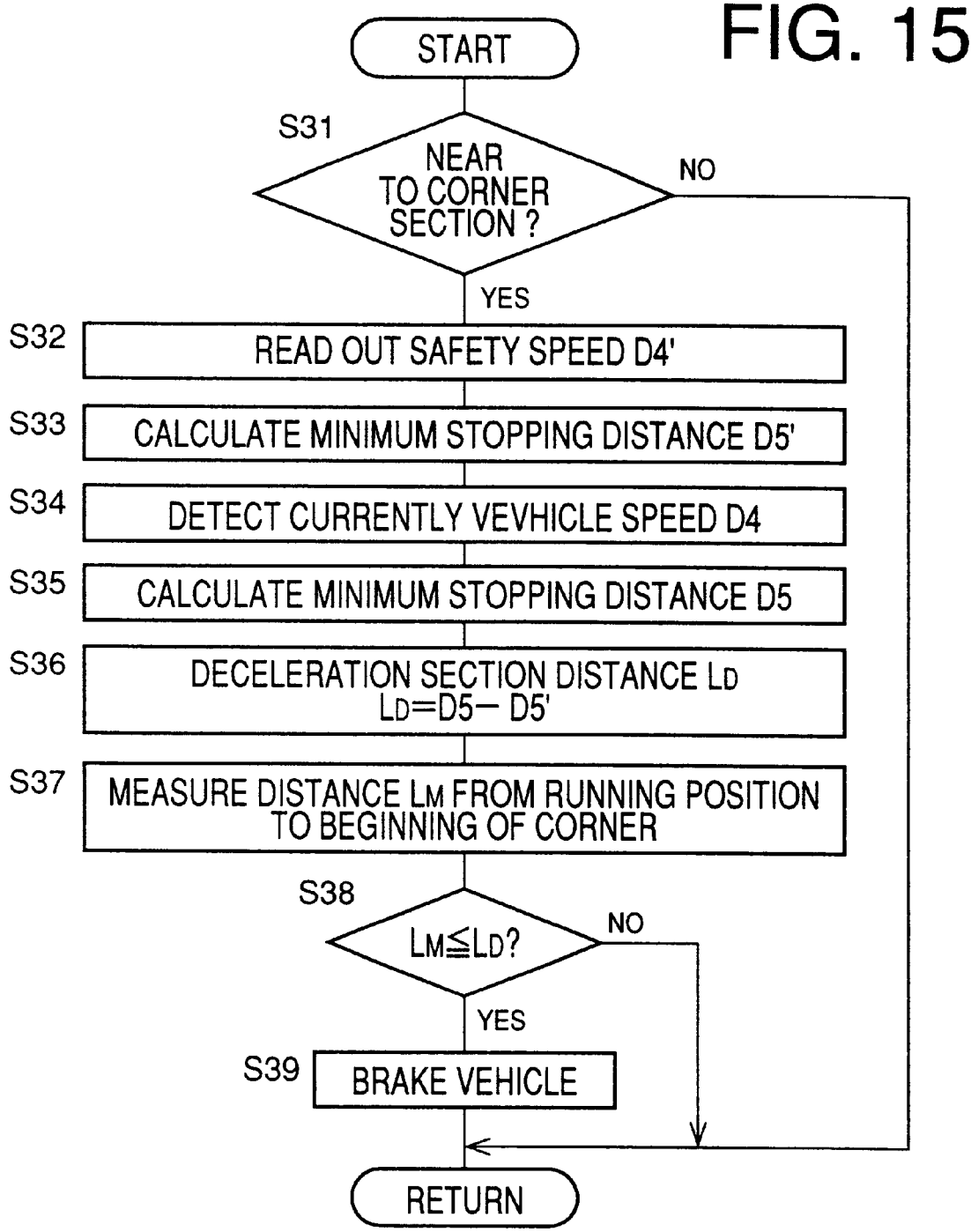
FIG. 15 is a flow chart illustrating a routine executed according to a program stored in ROM of FIG. 14, for decelerating the vehicle.

Referring next to FIGS. 14 and 15, there will be described a fifth embodiment of the present invention. In FIGS. 14 and 15, the same reference numerals and characters as used in the first embodiment will be used to identify the corresponding elements, and redundant description of these elements will not be provided in the interest of simplification of the explanation.

FIG. 14 is a block diagram schematically illustrating the fourth embodiment of the present invention, in the form of an apparatus for decelerating the vehicle when the vehicle is approaching a corner of the roadway (when the vehicle is going to turn). The present apparatus includes a signal processing unit 86 having an input port to which a navigation system 88 as well as the above-indicated sensors 10, 12, 14, 16 is connected. The navigation system 88 is adapted to measure a position in which the vehicle is currently running, so as to locate the position in a road map which is stored in the same system. The signal processing unit 86 further has an output port to which the engine actuator 76, the A/T actuator 80 and the brake actuator 84 as well as the indicator 40 are connected. The engine actuator 76 serves to change the output of the engine 74. The A/T actuator 80 serves to change the transmission ratio of the A/T 78 which transmits the output of the engine 74 to the vehicle wheel. The brake actuator 84 serves to change the braking force generated by the brake 82.

The vehicle is generally required to be decelerated when the vehicle running straight is approaching a corner of the roadway, so that the vehicle passes through the corner section with safety. To this end, it is effective to provide the vehicle driver with information indicative of a distance to the beginning of the corner, at which the vehicle driver is required to activate the brake 82. Further, in case the driver fails to activate the brake 82 at an appropriate position relative to the corner, it is desirable that the brake 82 be automatically activated. The predicting apparatus constructed according to the first embodiment provides the driver with information in the form of the distance through which the vehicle runs while being braked to stop by the braking system operated with the full braking capacity during the running of the vehicle at a certain value of the speed, namely, while the vehicle running speed is reduced from the certain value to zero. Accordingly, where the vehicle running straight at the speed of 100 [km/h] should be decelerated to 50 [km/h] so as to pass through a corner with safety, for example, the distance through which the vehicle runs while being braked by the braking system operated with the full braking capacity to reduce the running speed from 100 [km/h] to 50 [km/h] can be obtained, by subtracting the minimum stopping distance D5' corresponding to the brake application vehicle speed of 50 [km/h], from the minimum stopping distance D5 corresponding to the brake application vehicle speed of 100 [km/h]. Thus, it is possible to know the running distance of the vehicle during the deceleration with the full braking capacity from a first speed to a second speed which is lower than the first speed but higher than zero. The navigation system 88 is capable of locating the current position of the running vehicle and the beginning of the corner in the road map stored therein, and then calculating the distance from the current position to the beginning of the corner. The information indicating the moment and position at which the braking operation should be initiated during the straight running of the vehicle is thus given to the driver, so that the running speed is reduced to a safety level before arrival of the vehicle at the corner of the roadway.

Further, in the apparatus according to the present fifth embodiment, the vehicle is automatically braked by the braking system operated with the full braking capacity in a case where the distance to the beginning of the corner becomes equal to or smaller than the calculated minimum stopping distance due to the driver's failure to decelerate the vehicle by a suitable braking operation while the vehicle is approaching the corner. The vehicle running speed is thus reduced to the safety level irrespective of whether the suitable braking operation is effected by the driver or not.

FIG. 15 is a flow chart illustrating a routine executed according to a program stored in the ROM 34, for decelerating the vehicle when the vehicle is approaching a corner of the roadway. This decelerating routine is initiated with step S31 in which the navigation system 88 judges whether the vehicle's current running position is near or short of the corner of the roadway. If the current running position is not near the corner, a negative decision is obtained in step S31, and one cycle of execution of the routine is immediately terminated. If the current running position is near the corner, an affirmative decision is obtained in step S31, and the control flow then goes to step S32.

Step S32 is implemented to read out a safety speed D4' from speed information stored in the navigation system 88. The safety speed D4' is a recommended speed at which the vehicle is supposed to pass through the corner with safety. Step S32 is followed by step S33 in which the currently detected values D1–D3 and the safety speed D4' are substituted into one of the predicting equations which corresponds to the level of the read-out safety speed D4' for calculating the minimum stopping distance D5' where the brake application vehicle speed is equal to the safety speed D4'.

The control flow then goes to step S34 in which the current running speed D4 is detected. Step S34 is followed by step S35 in which the current running speed D4 and the currently detected values D1–D3 are substituted into one of the predicting equations which corresponds to the level of the current running speed D4, for calculating the minimum stopping distance D5 where the brake application vehicle speed is equal to the current running speed D4.

Step S36 is then implemented to calculate a distance $L_D$ through which the vehicle runs while being decelerated by the braking system operated with the full braking capacity so that the running speed has been reduced to the safety speed when the vehicle reaches the beginning of the corner. In step S36, the distance $L_D$ is obtained by subtracting the minimum stopping distance D5' from the minimum stopping distance D5. Step S36 is followed by step S37 in which a distance $L_M$ from the vehicle's current position to the beginning of the corner is measured by the navigation system 88. The control flow then goes to step S38 which is implemented to judge whether the distance $L_M$ is equal to or smaller than the distance $L_D$. If the distance $L_M$ is equal to or smaller than the distance $L_D$, an affirmative decision is obtained in step S38. The affirmative decision in step S38 is followed by step S39 in which the vehicle is automatically braked, with the brake 82 being fully operated, by the engine actuator 76, the A/T actuator 80 and the brake actuator 84 (principally by the brake actuator 84), for optimizing the running speed upon arrival of the vehicle at the corner. If the distance $L_M$ is larger than the distance $L_D$, a negative decision is obtained in step S38. In this case, the control flows goes back to step S31 without implementing step S39.

Figure 16:
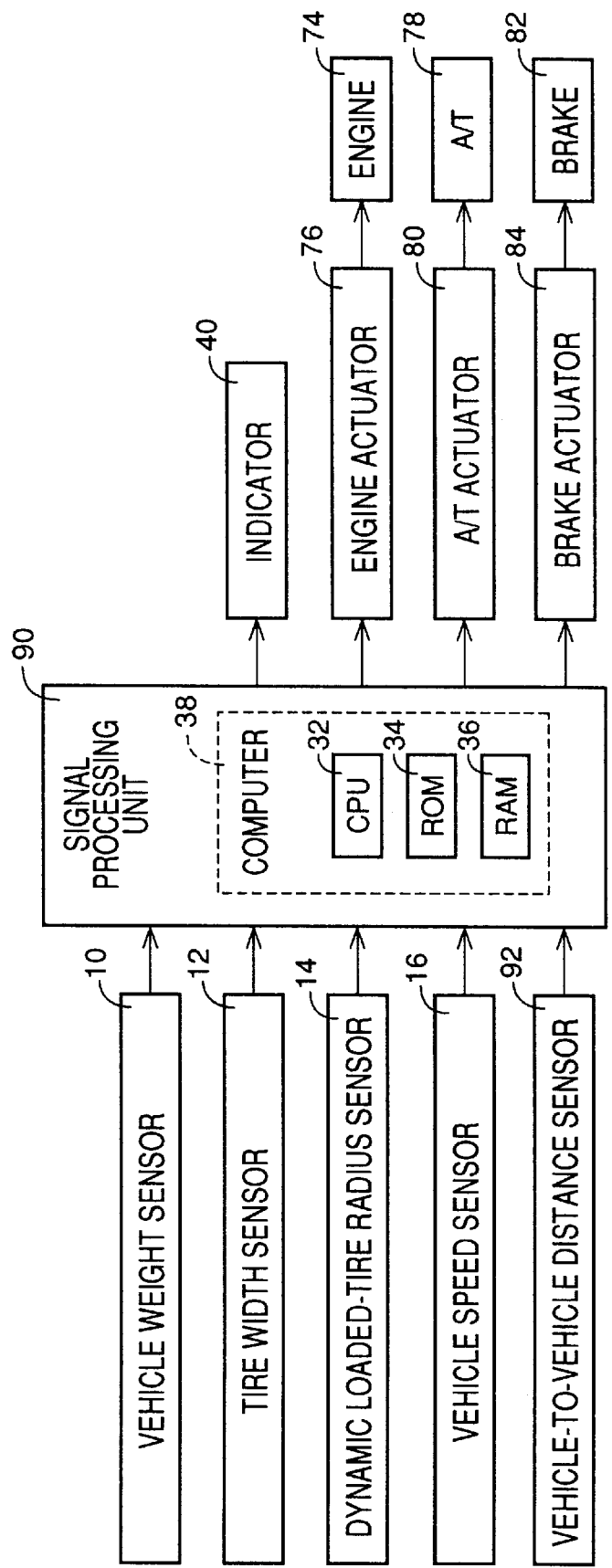
FIG. 16 is a block diagram illustrating a sixth embodiment of the present invention, in the form of an apparatus for preventing a front-end collision of the vehicle with a leading vehicle.
Figure 17:
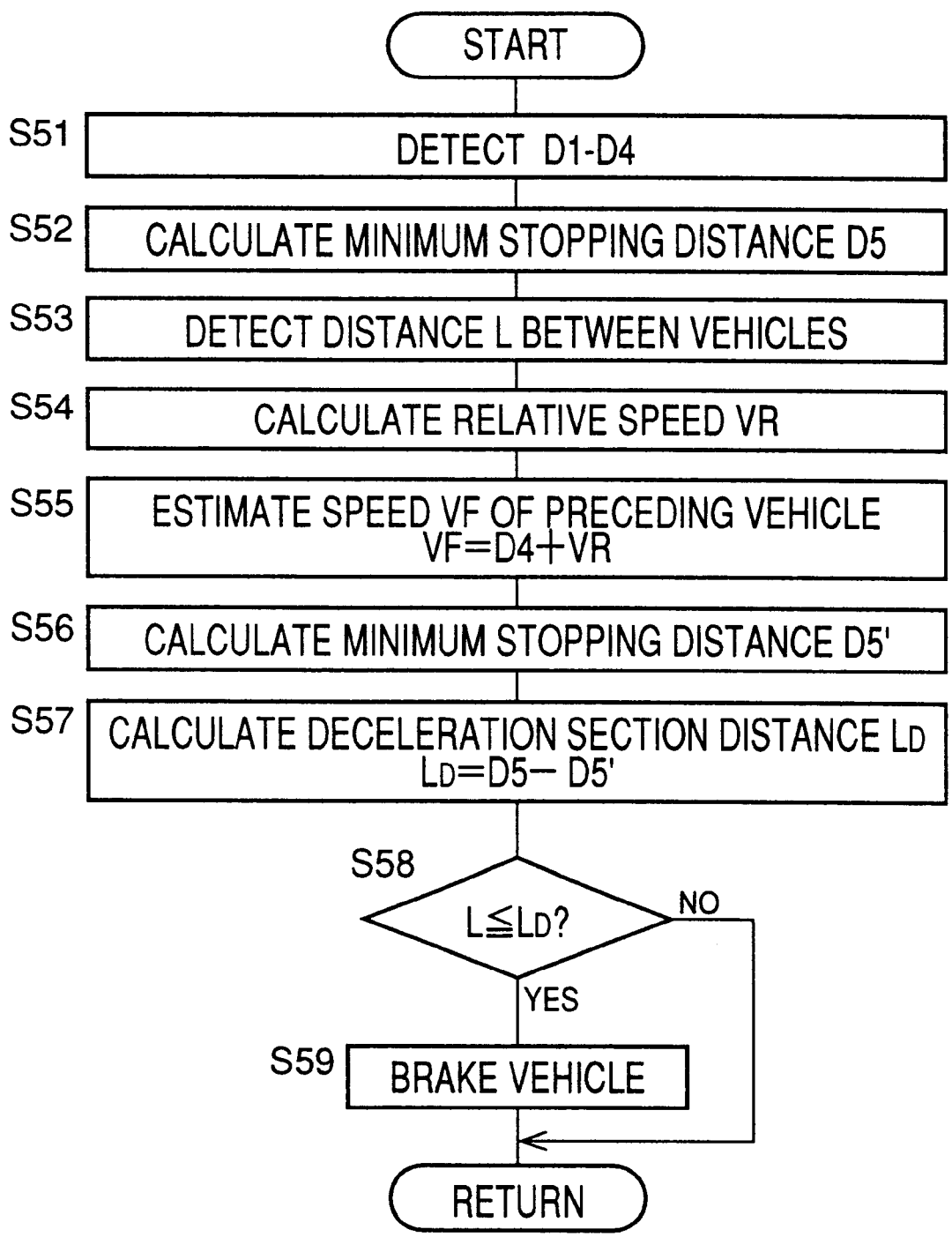
FIG. 17 is a flow chart illustrating a routine executed according to a program stored in ROM of FIG. 16, for preventing the front-end collision of the vehicle.
Figure 18:
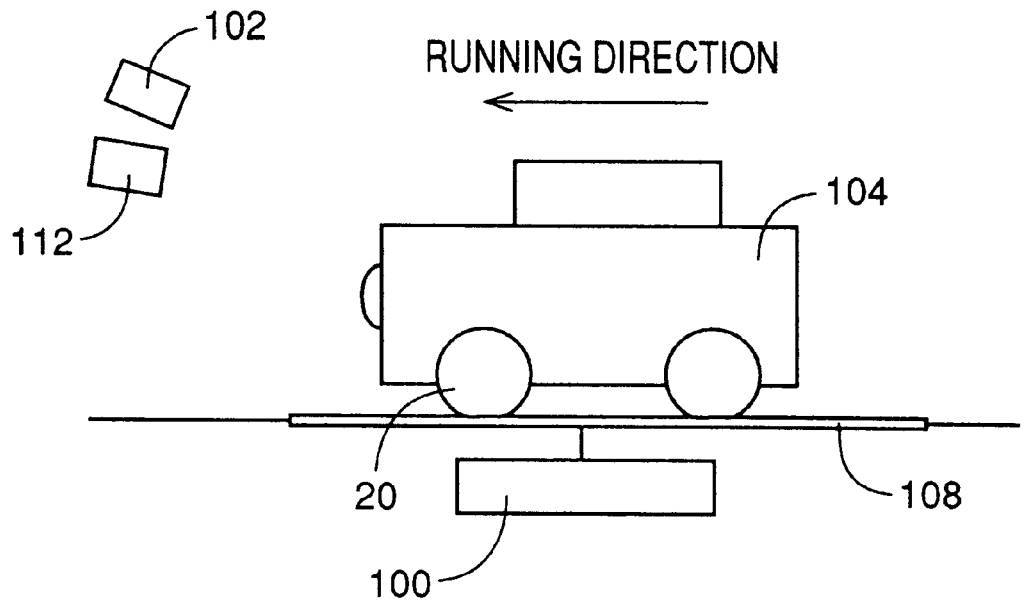
FIG. 18 is a side view showing a seventh embodiment of the present invention, in the form of an apparatus which is installed at a suitable position on the roadway, for predicting the minimum stopping distance of the running vehicle by brake application.
Figure 19:
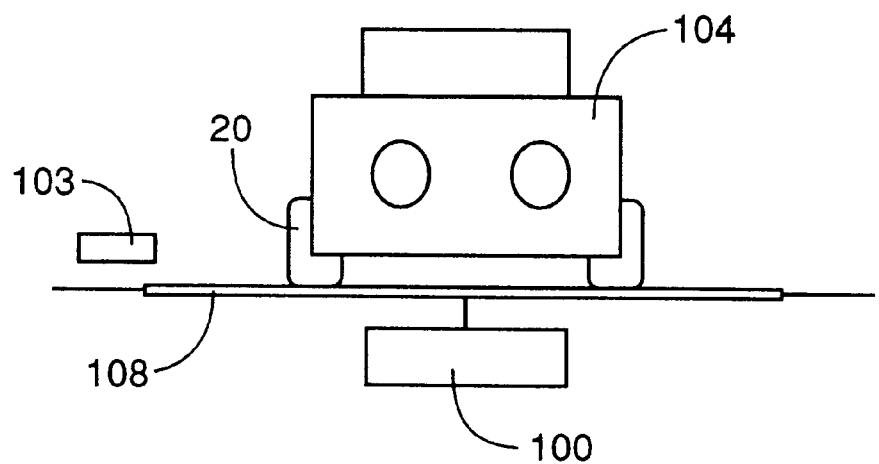
FIG. 19 is a front view showing the apparatus of FIG. 18.

Referring next to FIGS. 16 and 17, there will be described a sixth embodiment of the present invention. In FIGS. 16 and 17, the same reference numerals and characters as used in the first embodiment will be used to identify the corresponding elements, and redundant description of these elements will not be provided in the interest of simplification of the explanation.

FIG. 16 is a block diagram schematically illustrating the sixth embodiment of the present invention, in the form of an apparatus for preventing a front-end collision of the vehicle with a leading vehicle, i.e., a vehicle running ahead of the subject vehicle. The present apparatus includes a signal processing unit 90 having an input port to which a vehicle-to-vehicle distance sensor 92 as well as the above-indicated sensors 10, 12, 14, 16 is connected. The vehicle-to-vehicle distance sensor 92 is adapted to detect a distance from the subject vehicle to the leading vehicle. The signal processing unit 90 further has an output port to which the engine actuator 76, the A/T actuator 80 and the brake actuator 84 as well as the indicator 40 are connected. The engine actuator 76 serves to change the output of the engine 74. The A/T actuator 80 serves to change the transmission ratio of the A/T 78 which transmits the output of the engine 74 to the vehicle wheel. The brake actuator 84 serves to change the braking force generated by the brake 82.

FIG. 17 is a flow chart illustrating a routine executed according to a program stored in the ROM 34, for preventing the front-end collision of the subject vehicle with the leading vehicle. This front-end-collision preventing routine is initiated with step S51 to detect the vehicle weight D1, the tire width D2, the dynamic loaded-tire radius D3 and the vehicle running speed D4. Step S51 is followed by step S52 in which the detected values D1–D4 are respectively substituted into one of the predicting equations which corresponds to the level of the detected vehicle running speed D4, to calculate the minimum stopping distance D5 where the brake application vehicle speed is equal to the current vehicle running speed D4. The control flow then goes to step S53 in which the distance L between the subject vehicle and the leading vehicle is detected by the vehicle-to-vehicle distance sensor 92. Step S53 is followed by step S54 in which the detected distance L is differentiated to obtain a derivative of the distance with respect to the time, for calculating a relative speed VR of the subject vehicle and the leading vehicle. The relative speed VR is expressed by the following equation:

$$VR=VF-D4$$

where, VF: running speed of the leading vehicle The control flow then goes to step S55 in which the running speed VF of the leading vehicle is estimated by the following equation:

$$VF=VR+D4$$

Step S55 is followed by step S56 in which the currently detected values D1–D3 and the running speed VF of the leading vehicle are substituted into one of the predicting equations which corresponds to the level of the running speed VF, for obtaining the minimum stopping distance D5' where the brake application vehicle speed is equal to the running speed VF. The control flow then goes to step S57 which is implemented to calculate the distance $L_D$ through which the subject vehicle runs while being decelerated with the full braking capacity from the running speed D4 to the running speed VF. In step S57, the distance $L_D$ is obtained by subtracting the minimum stopping distance D5' from the minimum stopping distance D5. Step S57 is followed by step S58 which is implemented to judge whether the distance L is equal to or smaller than the distance $L_D$. If the distance L is equal to or smaller than the distance $L_D$, an affirmative decision is obtained in step S58. The affirmative decision in step S58 is followed by step S59 in which the vehicle is automatically braked by the braking system operated with the full braking capacity by the engine actuator 76, the A/T actuator 80 and the brake actuator 84 (principally by the brake actuator 84), for preventing the front-end collision of the subject vehicle with the leading vehicle. If the distance L is larger than the distance $L_D$, a negative decision is obtained in step S58. In this case, the control flows goes back to step S51 without implementing step S59.

Referring next to FIGS. 18–21, there will be described a seventh embodiment of the present invention. In FIGS. 18–21, the same reference numerals and characters as used in the first embodiment will be used to identify the corresponding elements, and redundant description of these elements will not be provided in the interest of simplification of the explanation.

While the minimum-stopping-distance predicting apparatus constructed according to the first embodiment is installed on the vehicle, a minimum-stopping-distance predicting apparatus of the present seventh embodiment is adapted to be installed at a suitable position on the roadway. The present predicting apparatus, which is shown in a side view of FIG. 18 and a front view of FIG. 19, includes a gravimeter 100, a speedmeter 102 and a camera 103.

The gravimeter 100 is disposed at a position through which a vehicle 104 passes, and includes a measurement plate 108 with which all of the tires 20 are simultaneously in contact when the vehicle 104 passes through the gravimeter 100 so that the measurement plate 108 receives the gross weight of the vehicle 104. The speed meter 102, which may be of a radar using the Doppler effect, for example, is disposed in proximity to the vehicle 104 passing the gravimeter 100. The camera 103 is disposed in proximity to the tire 20 when the vehicle 104 passes the gravimeter 100, so that an image of the tire 20 as viewed in the radial direction of the tire is taken.

In the present predicting apparatus constructed as described above, the gross weight, the running speed of the vehicle 104 and the shape of the tire 20 are simultaneously obtained, when the vehicle 104 passes the specific position of the measurement plate 108.

Figure 20:
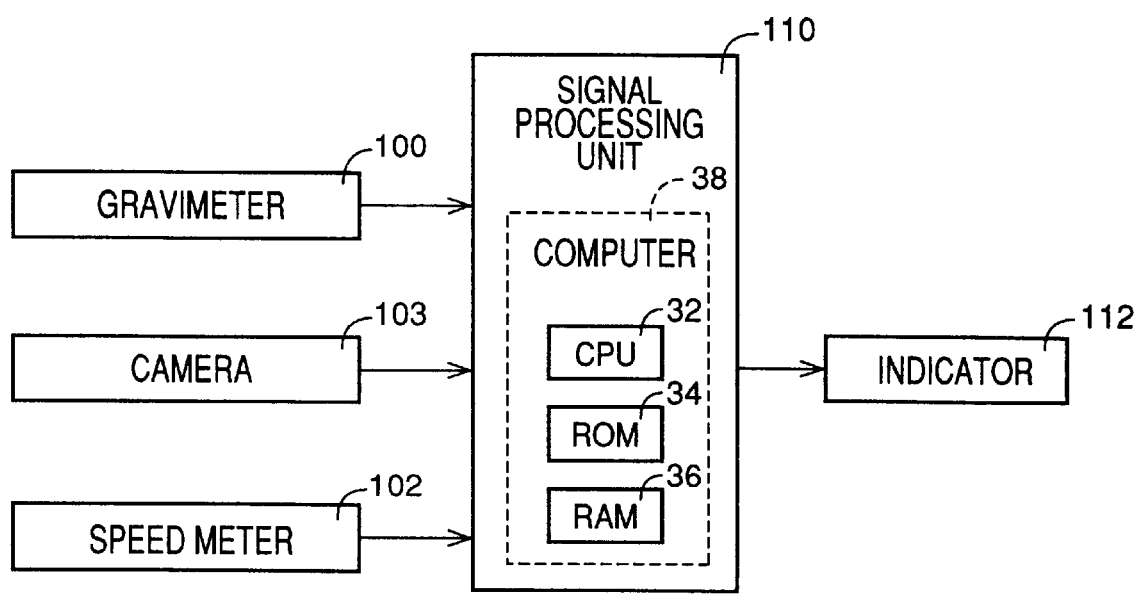
FIG. 20 is a block diagram illustrating an arrangement of the apparatus of FIG. 18.

FIG. 20 is a block diagram schematically illustrating the predicting apparatus of the present seventh embodiment. The present apparatus includes a signal processing unit 110 having an input port to which the gravimeter 100, the speed meter 102 and the camera 103 are connected. The signal processing unit 110 further has an output port to which an indicator 112 for indicating the predicted minimum stopping distance of the vehicle is connected. The indicator 112 is provided at a position in proximity to the vehicle 104 passing the gravimeter 100, so that the predicted minimum stopping distance indicated on the indicator 112 is easily visually recognized by the driver of the vehicle 104.

FIG. 21 is a flow chart illustrating a stopping-distance predicting routine executed according to a program stored in the ROM 34. This stopping-distance predicting routine is initiated with step S71 to judge whether the vehicle 104 has arrived at the gravimeter 100 or not. This decision is made by seeing if the output signal generated by the gravimeter 100 has changed or not. If the output signal has not changed, the vehicle 104 is considered not to have arrived at the gravimeter 100, whereby a negative decision is obtained in step S71. In this case, one cycle of execution of the present routine program is immediately terminated. If the output signal has changed, on the other hand, the vehicle 104 is considered to have arrived at the gravimeter 100. In this case, an affirmative decision is obtained in step S71, and the control flow goes to step S72.

In step S72, the vehicle weight D1 is measured by the gravimeter 100. Step S72 is followed by step S73 in which an image of the tire 20 is obtained by the camera 103. Subsequently, step S74 is implemented to estimate the dynamic loaded-tire radius D3 on the basis of the obtained image of the tire 20.

Referring to FIG. 2, the estimation of the dynamic loaded-tire radius D3 will be specifically explained.

The image of the tire 20 is first subjected to a binary processing or other suitable processing, so that the contour of the tire 20 in the graphic image is extracted or signaled, as shown in FIG. 2. The vertical dimension S1 and the horizontal dimension S2 of the tire 20 are then measured.

The static loaded-tire radius R3 of the tire 20 is expressed by the following equation (1):

$$R3=S1-S2/2 \qquad (1)$$

By taking account of the above-described relationship among the dynamic loaded-tire radius R1, the non-loadedtire radius R2 and the static loaded-tire radius R3 which is expressed as R2>R1>R3, the dynamic loaded-tire radius R1 is supposed to be approximately equal to (R2 +R3)/2. That is, the dynamic loaded-tire radius R1 is expressed by the following equation (2):

$$R1 \approx (R2+R3)/2 \quad (2)$$

The non-loaded-tire radius under R2 is supposed to be approximately equal to S2/2 and is accordingly expressed by the following equation (3):

$$R2 \approx S2/2 \quad (3)$$

By substituting the equations (1) and (3) into the equation (2), the dynamic loaded-tire radius R1 is expressed by the following equation:

$$R1 \approx S1/2$$

That is, the dynamic loaded-tire radius R1 is supposed to be approximately equal to S1/2.

In step S74, the dynamic loaded-tire radius D3 is thus estimated to be a half of the vertical dimension S1 of the contour of the tire 20.

Step S74 is followed by step S75 in which the width D2 of the tire 20 is estimated according to a predetermined rule, on the basis of the estimated dynamic loaded-tire radius D3 and other data. The control flow then goes to step S76 in which the running speed D4 of the vehicle 104 is measured by the speedmeter 102. Step S76 is followed by step S77 in which the obtained values D1–D4 are respectively substituted into one of the predicting equations which corresponds to the level of the vehicle running speed D4, so that the predicting equation provides the minimum stopping distance D5 of which the vehicle driver is informed by the indicator 112.

In the apparatus constructed according to the present seventh embodiment, the tire width D2 is estimated since the value of the tire width D2 is used for predicting the minimum stopping distance D5. However, the minimum stopping distance D5 may be predicted without using the value of the tire width D2. In this case, the estimation of the tire width D2 is not required.

In each of the above-illustrated embodiments, the term "minimum stopping distance D5" is defined as a distance through which the vehicle runs for an active braking time, i.e., as a braking distance in its narrow sense. However, the term "minimum stopping distance D5" may be defined as a sum of the braking distance in its narrow sense and a free running distance through which the vehicle runs for a free running time, i.e., as a stopping distance in its narrow sense. In the latter case, the free running distance can be obtained by multiplying a standard value of the free running distance by the brake application vehicle speed.

While the presently preferred embodiments of this invention have been described above in detail by reference to the accompanying drawings, it is to be understood that the invention may be embodied with various changes, modifications and improvements, which may occur to those skilled in the art, without departing from the spirit and scope of the invention defined in the following claims.

What is claimed is:

1. A method of predicting a minimum stopping distance of a subject vehicle required to stop the subject vehicle by activation of a subject vehicle braking system thereof during running of the subject vehicle, comprising:

a step of obtaining measurement data for each of at least one sample vehicle which is braked by a sample vehicle braking system thereof operated with its full braking capacity, said at least one sample vehicle including at least one of a vehicle different in type from said subject vehicle and a vehicle identical in type with said subject vehicle but different in specification from said subject vehicle, said sample vehicle braking system being one of a braking system different in type from said subject vehicle braking system and a braking system identical in type with said subject vehicle braking system, said measurement data including a weight of said each sample vehicle, a running speed of said each sample vehicle when said sample vehicle braking system of said each sample vehicle starts to be activated, a stopping distance through which said each sample vehicle has run to be stopped, and a radius of a tire of said each sample vehicle;

a step of obtaining at least one predicting equation on the basis of said measurement data in a statistical manner, said at least one predicting equation providing a predicted value of said minimum stopping distance on the basis of subject vehicle data for said subject vehicle, said subject vehicle data including a weight of said subject vehicle, a running speed of said subject vehicle when said subject vehicle braking system of said subject vehicle starts to be activated, and a radius of a tire of said subject vehicle; and a step of calculating said predicted value of said minimum stopping distance of said subject vehicle, by substituting said subject vehicle data into one of said at least one predicting equation, so that said one predicting equation provides said predicted value of said minimum stopping distance.

2. A method according to claim 1, wherein said at least one predicting equation includes a linear multiple regression function for providing said predicted value of said minimum stopping distance on the basis of said subject vehicle data.

3. A method according to claim 1, wherein said measurement data for said each sample vehicle further include an axial width of said tire of said each sample vehicle, and said subject vehicle data for said subject vehicle further include an axial width of said tire of said subject vehicle.

4. A method according to claim 3, wherein said at least one predicting equation includes a linear multiple regression function for providing a criterion variable X5 which includes a component of D5×D5, on the basis of explanatory variables X1, X2, X3 and X4 which include a component of D1×D1, a component of 1/D2, a component of D3 ×D3 and a component of D4×D4, respectively, where D1, D2, D3, D4 and D5 represent said weight of said subject vehicle, said axial width of said tire of said subject vehicle, said radius of said tire of said subject vehicle, said running speed of said subject vehicle, and said minimum stopping distance of said subject vehicle, respectively.

5. A method according to claim 4, wherein said at least one predicting equation includes a linear multiple regression function for providing a criterion variable X5 on the basis of explanatory variables X1, X2, X3 and X4, said X1, X2, X3, X4 and X5 being respectively represented by the following equations:

$$X1 = D1 \times D1/1000;$$

$$X2 = 1000/D2;$$

$$X3 = D3 \times D3 \times 1000;$$

$$X4 = D4 \times D4;$$

$$X5 = D5 \times D5;$$

where

D1 represents said weight of said subject vehicle;

D2 represents said axial width of said tire of said subject vehicle;

D3 represents said radius of said tire of said subject vehicle;

D4 represents said running speed of said subject vehicle; and

D5 represents said minimum stopping distance of said subject vehicle.

6. A method according to claim 1, wherein said at least one predicting equation consists of a plurality of equations which serve for respective different levels of said running speed of said subject vehicle.

7. A method according to claim 1, wherein said at least one equation includes an equation for providing said predicted value of said minimum stopping distance, on the basis of said subject vehicle data and a characteristic value of a tread pattern provided on a surface of said tire of said subject vehicle.

8. A method according to claim 1, wherein said radius of said tire of said each sample vehicle is a dynamic loaded-tire radius of said tire of said each sample vehicle, and said radius of said tire of said subject vehicle is a dynamic loaded-tire radius of said tire of said subject vehicle.

9. A method according to claim 1, wherein said subject vehicle braking system is identical, for applying a braking torque to a vehicle wheel, with said sample vehicle braking system.

10. A method according to claim 9, wherein each of said subject vehicle braking system and sample vehicle braking system is a friction brake.

11. A method of predicting a decelerating section distance through which a subject vehicle runs while being decelerated by a subject vehicle braking system thereof operated with its full braking capacity from a first nominal speed to a second nominal speed which is lower than said first nominal speed but higher than zero, comprising:

a step of obtaining measurement data for each of at least one sample vehicle which is driven at said first nominal speed and then braked by a sample vehicle braking system thereof operated with its full braking capacity, and which is driven at said second nominal speed and then braked by said sample vehicle braking system operated with its full braking capacity, said at least one sample vehicle including at least one of a vehicle different in type from said subject vehicle and a vehicle identical in type with said subject vehicle but different in specification from said subject vehicle, said sample vehicle braking system being one of a braking system different in type from said subject vehicle braking system and a braking system identical in type with said subject vehicle braking system, said measurement data including a weight of said each sample vehicle, a first running speed of said each sample vehicle when said sample vehicle braking system of said each sample vehicle starts to be activated during running of said each sample vehicle at said first nominal speed, a second running speed of said each sample vehicle when said sample vehicle braking system of said each sample vehicle starts to be activated during running of said each sample vehicle at said second nominal speed, a first stopping distance through which said each sample vehicle has run to be stopped where said each sample vehicle is driven at said first nominal speed, a second stopping distance through which said each sample vehicle has run to be stopped where said each sample vehicle is driven at said second nominal speed, and a radius of a tire of said each sample vehicle;

a step of obtaining at least one first predicting equation and at least one second predicting equation on the basis of said measurement data in a statistical manner, said at least one first predicting equation providing a predicted value of a first minimum stopping distance required to stop said subject vehicle where said subject vehicle is driven at said first nominal speed, on the basis of first subject vehicle data for said subject vehicle, said first subject vehicle data including a weight of said subject vehicle, a first running speed of said subject vehicle when said subject vehicle braking system of said subject vehicle starts to be activated during running of said subject vehicle at said first nominal speed, and a radius of a tire of said subject vehicle, said at least one second predicting equation providing a predicted value of a second minimum stopping distance required to stop said subject vehicle where said subject vehicle is driven at said second nominal speed, on the basis of second subject vehicle data for said subject vehicle, said second subject vehicle data including said weight of said subject vehicle, a second running speed of said subject vehicle when said subject vehicle braking system of said subject vehicle starts to be activated during running of said subject vehicle at said second nominal speed, and said radius of said tire of said subject vehicle;

a step of calculating said predicted value of said second minimum stopping distance, by substituting said second subject vehicle data into one of said at least one second predicting equation, so that said one second predicting equation provides said predicted value of said second minimum stopping distance;

a step of calculating said predicted value of said first minimum stopping distance, by substituting said first subject vehicle data into one of said at least one first predicting equation, so that said one first predicting equation provides said predicted value of said first minimum stopping distance; and a step of obtaining said decelerating section distance by subtracting said predicted value of said second minimum stopping distance from said predicted value of said first minimum stopping distance.

12. A method according to claim 11, wherein said second running speed is equal to a running speed of a leading vehicle which runs ahead of said subject vehicle which runs at said first running speed, further comprising:

a step of detecting a distance between said subject vehicle and said leading vehicle; and a step of estimating said running speed of said leading vehicle on the basis of said first running speed and a rate of change of said distance between said subject vehicle and said leading vehicle.

13. A method according to claim 11, wherein said subject vehicle braking system is identical, for applying a braking torque to a vehicle wheel, with said sample vehicle braking system.

14. A method according to claim 13, wherein each of said subject vehicle braking system and said sample vehicle braking system is a friction brake.

15. A method according to claim 11, wherein said measurement data for said each sample vehicle further include an axial width of said tire of said each sample vehicle, and said first and second subject vehicle data for said subject vehicle further include an axial width of said tire of said subject vehicle.

16. An apparatus for predicting a minimum stopping distance of a subject vehicle required to stop the subject vehicle by activation of a braking system thereof during running of the subject vehicle, comprising:

a data obtaining device for obtaining subject vehicle data for said subject vehicle, said subject vehicle data including a weight of said subject vehicle, a running speed of said subject vehicle, and a radius of a tire of said subject vehicle;

a memory device for storing therein at least one predicting equation for providing a predicted value of said minimum stopping distance on the basis of said subject vehicle data; and a stopping-distance predicting device for providing said predicted value of said minimum stopping distance, by substituting said subject vehicle data into one of said at least one predicting equation.

17. An apparatus according to claim 16, wherein said data obtaining device includes a force sensor for detecting a force acting between sprung members of said subject vehicle and an axle of said subject vehicle, a camera for taking an image of said tire, and a rotational speed sensor for detecting at least one of a rotational speed of an output shaft of a transmission of said subject vehicle and a rotational speed of a wheel of said subject vehicle.

18. An apparatus according to claim 17, wherein said stopping-distance predicting device includes a signal processing device which obtains said subject vehicle data for said subject vehicle, on the basis of an output signal provided by said force sensor, an output signal provided by said camera, and an output signal provided by said rotational speed sensor, respectively.

19. An apparatus according to claim 16, wherein said apparatus is installed on said subject vehicle, further comprising an indicator for indicating said predicted value of said minimum stopping distance.

20. An apparatus according to claim 16, wherein said apparatus is installed at a specific position of a roadway through which said subject vehicle passes, further comprising an indicator for indicating said predicted value of said minimum stopping distance.

21. An apparatus installed on a subject vehicle, for predicting a minimum stopping distance of said subject vehicle required to stop the subject vehicle by activation of a braking system thereof during running of the subject vehicle, so as to control a running state of said subject vehicle, comprising:

the apparatus defined in claim 10;

an actuator for changing said running state of said subject vehicle;

a control device for controlling said actuator on the basis of said minimum stopping distance which has been predicted by said apparatus defined in claim 10, such that a distance between said subject vehicle and an object which exists ahead of said subject vehicle is held equal to or larger than said minimum stopping distance.

22. An apparatus installed on a subject vehicle, for preventing a collision of said subject vehicle with a leading vehicle running ahead of said subject vehicle, by controlling a running state of said subject vehicle, comprising:

the apparatus defined in claim 16;

an actuator for changing said running state of said subject vehicle;

a detecting device for detecting a distance between said subject vehicle and said leading vehicle;

an estimating device for estimating a running speed of said leading vehicle on the basis of said running speed of said subject vehicle and a rate of change of said distance between said subject vehicle and said leading vehicle;

a decelerating-section-distance predicting device for predicting a decelerating section distance through which said subject vehicle runs while being decelerated by said braking system operated with its full braking capacity from said running speed of said subject vehicle to said running speed of said leading vehicle, on the basis of said predicted value of said minimum stopping distance of said subject vehicle and a predicted value of said minimum stopping distance of said leading vehicle which value is obtained by substituting said vehicle subject data into one of said at least one predicting equation; and a control device for controlling said actuator on the basis of said decelerating section distance, such that said distance between said subject vehicle and said leading vehicle is held equal to or larger than said decelerating section distance.

23. An apparatus according to claim 22, wherein a decelerating-section-distance predicting device predicts said decelerating section distance by subtracting said predicted value of said minimum stopping distance of said leading vehicle, from said predicted value of said minimum stopping distance of said subject vehicle.

24. An apparatus according to claim 16, wherein said at least one predicting equation includes a linear multiple regression function for providing said predicted value of said minimum stopping distance on the basis of said subject vehicle data for said subject vehicle.

25. An apparatus according to claims 16, wherein said at least one predicting equation includes a linear multiple regression function for providing a criterion variable X5 on the basis of explanatory variables X1, X2, X3 and X4, said X1, X2, X3, X4 and X5 being respectively represented by the following equations:

$$X1 = D1 \times D1/1000;$$

$$X2 = 1000/D2;$$

$$X3 = D3 \times D3 \times 1000;$$

$$X4 = D4 \times D4;$$

$$X5 = D5 \times D5;$$

where

D1 represents said weight of said subject vehicle,

D2 represents said axial width of said tire of said subject vehicle,

D3 represents said radius of said tire of said subject vehicle,

D4 represents said running speed of said subject vehicle, and

D5 represents said minimum stopping distance of said subject vehicle.

26. A method according to claim 16, wherein said subject vehicle data for said subject vehicle further includes an axial width of said tire of said subject vehicle.

* * * * *